(12) United States Patent
Ebtekar et al.

(10) Patent No.: US 10,037,617 B2
(45) Date of Patent: Jul. 31, 2018

(54) ENHANCED USER INTERFACE SYSTEMS INCLUDING DYNAMIC CONTEXT SELECTION FOR CLOUD-BASED NETWORKS

(71) Applicant: Cisco Technology, Inc., San Jose, CA (US)

(72) Inventors: Ali Ebtekar, Palo Alto, CA (US); Daniel Robert Garrison, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 399 days.

(21) Appl. No.: 14/732,995

(22) Filed: Jun. 8, 2015

(65) Prior Publication Data
US 2016/0253078 A1    Sep. 1, 2016

Related U.S. Application Data

(60) Provisional application No. 62/121,993, filed on Feb. 27, 2015, provisional application No. 62/121,999, filed on Feb. 27, 2015.

(51) Int. Cl.
*G06F 3/0484* (2013.01)
*G06T 11/20* (2006.01)
(Continued)

(52) U.S. Cl.
CPC .......... *G06T 11/206* (2013.01); *G06F 3/0481* (2013.01); *H04L 41/145* (2013.01); *G06F 2203/04803* (2013.01); *H04L 43/08* (2013.01)

(58) Field of Classification Search
CPC ..... H04L 43/04; H04L 67/10; G06F 3/04847; G06F 3/0482; G06F 3/04842; G06F 3/04845; G06T 11/206
See application file for complete search history.

(56) References Cited

U.S. PATENT DOCUMENTS

| 6,108,782 A | 8/2000 | Fletcher et al. |
|---|---|---|
| 6,178,453 B1 | 1/2001 | Mattaway et al. |

(Continued)

FOREIGN PATENT DOCUMENTS

| CN | 101719930 | 6/2010 |
|---|---|---|
| CN | 101394360 | 7/2011 |

(Continued)

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

(Continued)

*Primary Examiner* — Anil Bhargava
(74) *Attorney, Agent, or Firm* — Polsinelli PC

(57) ABSTRACT

According to one embodiment, a network device associates each tile object of a plurality of tile objects with a tile set. Each tile object includes one or more parameters of a communication network, and each tile set linked to one or more context objects for a dashboard interface. The network device further determines a dynamic context for the communication network, and identifies at least one tile set linked to a context object of the one or more context objects that matches the dynamic context (the at least one tile set includes one or more associated tile objects). The network device also determines a respective display position (e.g., defined by the dashboard interface) to each tile object of the one or more associated tile objects, and provides the dashboard interface for display, with each tile object of the one or more associated tile objects displayed according to the respective display position.

20 Claims, 14 Drawing Sheets

(51) Int. Cl.
*G06F 3/0481* (2013.01)
*H04L 12/24* (2006.01)
*H04L 12/26* (2006.01)

(56) References Cited

U.S. PATENT DOCUMENTS

| | | |
|---|---|---|
| 6,298,153 B1 | 10/2001 | Oishi |
| 6,343,290 B1 | 1/2002 | Cossins et al. |
| 6,721,804 B1 | 4/2004 | Rubin et al. |
| 6,733,449 B1 | 5/2004 | Krishnamurthy et al. |
| 7,277,948 B2 | 10/2007 | Igarashi et al. |
| 7,480,672 B2 | 1/2009 | Hahn et al. |
| 7,496,043 B1 | 2/2009 | Leong et al. |
| 7,881,957 B1 | 2/2011 | Cohen et al. |
| 7,917,647 B2 | 3/2011 | Cooper et al. |
| 8,028,071 B1 | 9/2011 | Mahalingam et al. |
| 8,041,714 B2 | 10/2011 | Aymeloglu et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,301,746 B2 | 10/2012 | Head et al. |
| 8,345,692 B2 | 1/2013 | Smith |
| 8,406,141 B1 | 3/2013 | Couturier et al. |
| 8,448,171 B2 | 5/2013 | Donnellan et al. |
| 8,495,356 B2 | 7/2013 | Ashok et al. |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,663 B2 | 10/2013 | Baucke et al. |
| 8,590,050 B2 | 11/2013 | Nagpal et al. |
| 8,630,291 B2 | 1/2014 | Shaffer et al. |
| 8,639,787 B2 | 1/2014 | Lagergren et al. |
| 8,660,129 B1 | 2/2014 | Brendel et al. |
| 8,719,804 B2 | 5/2014 | Jain |
| 8,775,576 B2 | 7/2014 | Hebert et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,164,795 B1 | 10/2015 | Vincent |
| 9,167,050 B2 | 10/2015 | Durazzo et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0228585 A1 | 12/2003 | Inoko et al. |
| 2004/0095237 A1 | 5/2004 | Chen et al. |
| 2006/0126665 A1 | 6/2006 | Ward et al. |
| 2007/0242830 A1 | 10/2007 | Conrado et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0072489 A1 | 3/2011 | Parann-Nissany |
| 2011/0075667 A1 | 3/2011 | Li et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231899 A1 | 9/2011 | Pulier et al. |
| 2011/0239039 A1 | 9/2011 | Dieffenbach et al. |
| 2011/0252327 A1* | 10/2011 | Awasthi ......... H04L 43/045 |
| | | 715/736 |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1* | 7/2012 | Gotesdyner ......... H04L 12/6418 |
| | | 714/47.3 |
| 2012/0192075 A1* | 7/2012 | Ebtekar ............... H04L 12/6418 |
| | | 715/738 |

(56) References Cited

U.S. PATENT DOCUMENTS

| | | |
|---|---|---|
| 2012/0214506 A1 | 8/2012 | Skaaksrud et al. |
| 2012/0222106 A1 | 8/2012 | Kuehl |
| 2012/0240113 A1 | 9/2012 | Hur |
| 2012/0265976 A1 | 10/2012 | Spiers et al. |
| 2012/0281706 A1 | 11/2012 | Agarwal et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0091557 A1 | 4/2013 | Gurrapu |
| 2013/0097601 A1 | 4/2013 | Podvratnik et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0075357 A1* | 3/2014 | Flores ............... G06Q 10/0639 715/771 |
| 2014/0075501 A1 | 3/2014 | Srinivasan et al. |
| 2014/0108985 A1* | 4/2014 | Scott ................... G06F 3/0484 715/771 |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0189095 A1 | 7/2014 | Lindberg et al. |
| 2014/0189125 A1 | 7/2014 | Amies et al. |
| 2014/0222953 A1 | 8/2014 | Karve et al. |
| 2014/0282536 A1 | 9/2014 | Dave et al. |
| 2014/0282889 A1 | 9/2014 | Ishaya et al. |
| 2014/0297569 A1* | 10/2014 | Clark ................... G06Q 10/00 706/11 |
| 2014/0317261 A1 | 10/2014 | Shatzkamer et al. |
| 2014/0366155 A1 | 12/2014 | Chang et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0120914 A1 | 4/2015 | Wada et al. |
| 2015/0227405 A1 | 8/2015 | Jan et al. |
| 2015/0242204 A1 | 8/2015 | Hassine et al. |
| 2015/0281067 A1 | 10/2015 | Wu |
| 2015/0281113 A1 | 10/2015 | Siciliano et al. |
| 2015/0319063 A1 | 11/2015 | Zourzouvillys et al. |
| 2015/0326524 A1 | 11/2015 | Tankala et al. |
| 2015/0373108 A1 | 12/2015 | Fleming et al. |
| 2016/0062786 A1 | 3/2016 | Meng et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0188527 A1 | 6/2016 | Cherian et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. And VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://Iwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

(56) References Cited

OTHER PUBLICATIONS

CSS Corp, "Enterprise Cloud Gateway (ECG)—Policy driven framework environments," original published on or about Feb. 11, 2012; 1 page; http://www.css-cloud.com/platform/enterprise-cloud-gateway.php Fang K., "LISP MAC-EID-TO-RLOC Mapping (LISP based L2VPN)," Network Working Group, Internet Draft, CISCO Systems, Jan. 2012, 12 pages.

Herry, William, "Keep It Simple, Stupid: OpenStack nova-scheduler and its algorithm", May 12, 2012, IBM, 12 pages.

Hewlett-Packard Company, "Virtual context management on network devices", Research Disclosure, vol. 564, No. 60, Apr. 1, 2011, Mason Publications, Hampshire, GB, Apr. 1, 2011, 524.

Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

Kolyshkin, Kirill, "Virtualization in Linux," Sep. 1, 2006, XP055141648, 5 pages, https://web.archive.org/web/20070120205111/http://download.openvz.org/doc/openvz-intro.pdf.

Lerach, S.R.O., "Golem," http://www.lerach.cz/en/products/golem, accessed Jul. 22, 2015, 2 pages.

Linthicum, David, "VM Import could be a game changer for hybrid clouds", InfoWorld, Dec. 23, 2010, 4 pages.

Naik, Vijay K., et al., "Harmony: A Desktop Grid for Delivering Enterprise Computations," Grid Computing, 2003, Fourth International Workshop on Proceedings, Nov 17, 2003, pp. 1-11.

Nair, Srijith K. et al., "Towards Secure Cloud Bursting, Brokerage and Aggregation," 2012, 8 pages, www.flexiant.com.

Nielsen, "SimMetry Audience Measurement—Technology," http://www.nielsen-admosphere.eu/products-and-services/simmetry-audience-measurement-technology/, accessed Jul. 22, 2015, 8 pages.

Nielsen, "Television," http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Wikipedia, "Filter (software)", Wikipedia, Feb. 8, 2014, 2 pages, https://en.wikipedia.org/w/index.php?title=Filter %28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Amedro, Brian, et al., "An Efficient Framework for Running Applications on Clusters, Grids and Cloud," 2010, 17 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

Author Unknown, "Microsoft Cloud Edge Gateway (MCE) Series Appliance," Iron Networks, Inc., 4 pages.

Author Unknown, "Use Cases and Interactions for Managing Clouds, A White Paper from the Open Cloud Standards Incubator," Version 1.0.0, Document No. DSP-ISO0103, Jun. 16, 2010, 75 pages.

Citrix, "Citrix StoreFront 2.0" White Paper, Proof of Concept Implementation Guide, Citrix Systems, Inc., 2013, 48 pages.

Citrix, "CloudBridge for Microsoft Azure Deployment Guide," 30 pages.

Citrix, "Deployment Practices and Guidelines for NetScaler 10.5 on Amazon Web Services," White Paper, citrix.com, 2014, 14 pages.

De Canal, Marco, "Cloud Computing: Analisi Dei Modelli Architetturali E Delle Technologie Per Lo Sviluppo Di Applicazioni," 2011-2012, 149 pages.

Gedymin, Adam, "Cloud Computing with an emphasis on Google App Engine," Sep. 2011, 146 pages.

Good, Nathan A., "Use Apache Deltacloud to administer multiple instances with a single API," Dec. 17, 2012, 7 pages.

Logan, Marcus, "Hybrid Cloud Application Architecture for Elastic Java-Based Web Applications," F5 Deployment Guide Version 1.1, 2016, 65 pages.

Meireles, Fernando Miguel Dias, "Integrated Management of Cloud Computing Resources," 2013-2014, 286 pages.

Mu, Shuai, et al., "uLibCloud: Providing High Available and Uniform Accessing to Multiple Cloud Storages," 2012 IEEE, 8 pages.

Sun, Aobing, et al., "IaaS Public Cloud Computing Platform Scheduling Model and Optimization Analysis," Int. J. Communications, Network and System Sciences, 2011, 4, 803-811, 9 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

* cited by examiner

ENHANCED USER INTERFACE SYSTEMS INCLUDING DYNAMIC CONTEXT SELECTION FOR CLOUD-BASED NETWORKS

CROSS-REFERENCE TO RELATED APPLICATIONS

This application claims priority of U.S. Provisional Patent Application Ser. No. 62/121,993, filed on Feb. 27, 2015 and U.S. Provisional Patent Application Ser. No. 62/121,999, filed on Feb. 27, 2015, the entire contents of each are incorporated herein by reference.

TECHNICAL FIELD

The present technology pertains to networking tools, and more specifically to network visualization tools and graphical user interfaces.

BACKGROUND

Recent industry-wide shifts toward cloud-based service delivery and data consumption present new challenges for service providers to efficiently deliver data and adjust network resource usage according to dynamically changing business needs. For example, cloud-based providers often employ various real-time adjustment models to efficiently adapt and allocate network resources based on these changing business needs. Further, in order to efficiently serve consumers according to service assurance processes in such a dynamic environment, cloud-based providers typically employ various network management tools to monitor system diagnostics, perform system analytics, and the like.

However, conventional monitoring approaches for cloud-based services typically provide static or rigid dashboards confined to fixed decision trees and predefined workspaces, which insufficiently represent the dynamic and complex cloud-based environments. Instead, cloud based service providers require flexibility to quickly and efficiently monitor, allocate, and troubleshoot cloud-based network resources.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

A component or a feature that is common to more than one drawing is indicated with the same reference number in each of the drawings.

DESCRIPTION OF EXAMPLE EMBODIMENTS

Figure 1:
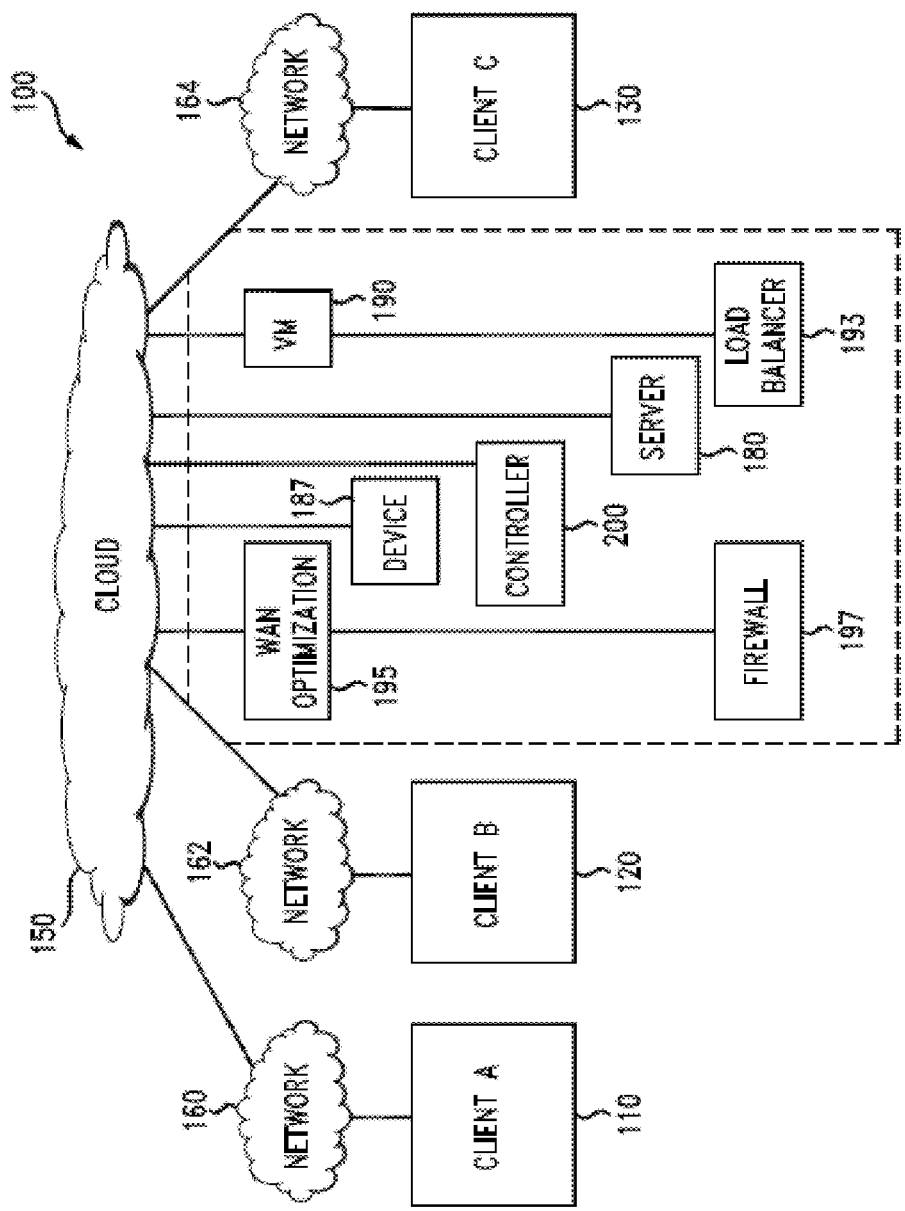
FIG. 1 illustrates a schematic block diagram of an example cloud architecture including nodes/devices interconnected by various methods of communication.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

According to one or more embodiments, the techniques disclosed herein optimize representations of cloud services and infrastructure using, for example, dashboard visualizations. For example, a network device (e.g., employed by cloud-based service providers, etc.) associated tile objects of a plurality of tile objects with a tile set. Typically, each tile object includes (or is associated with) one or more parameters of a communication network (e.g., a cloud-based network), and each tile set is linked to one or more context objects for a dashboard interface. The network device further determines a dynamic context for the communication network, and identifies at least one tile set linked to a context object that matches the dynamic context (with the at least one tile set including one or more associated tile objects). The network device also determines a respective display position defined by the dashboard interface to each tile object of the one or more associated tile objects, and provides the dashboard interface to a client device to cause the client device to display each tile object of the one or more associated tile objects according to the respective display position. These and other features are disclosed in greater detail below.

Description

A communication network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points, which can effectively extend the size or footprint of the network.

Networks can be segmented into sub-networks to provide a hierarchical, multilevel routing structure. For example, a network can be segmented into sub-networks using subnet addressing to create network segments. This way, a network can allocate various groups of IP addresses to specific network segments and divide the network into multiple logical networks.

Other networks, such as virtual networks (e.g., VLANs) are also available. For example, one or more LANs can be logically segmented to form a VLAN and allow a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN tunnels, as is appreciated by those skilled in the art.

The various networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

Cloud controllers and/or other cloud devices can be configured for cloud management. These devices can be pre-configured (i.e., come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

The disclosed technology addresses the need in the art for dynamic and interactive monitoring, troubleshooting and diagnostic tools, particularly adapted for a cloud-based environment. In this fashion, the disclosed systems, methods, and computer-readable storage media provide user interfaces that dynamically adjust to changing network conditions. For example, an exemplary cloud or virtual computing environment is provided in FIG. 1.

In particular, FIG. 1 illustrates a schematic block diagram of an example cloud architecture 100 including nodes/devices interconnected by various methods of communication. Cloud 150 can be a public, private, and/or hybrid cloud system. Cloud 150 can include resources, such as one or more Firewalls 197; Load Balancers 193; WAN optimization platforms 195; devices 187, such as switches, routers, intrusion detection systems, Auto VPN systems, or any hardware or software network device; servers 180, such as dynamic host configuration protocol (DHCP), domain naming system (DNS), or storage servers; virtual machines (VMs) 190; controllers, such as a cloud controller 200 or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 150 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide configuration services, such as auto VPN, automated deployments, automated wireless configurations, automated policy implementations, and so forth. In some cases, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage network diagnostic tools or graphical user interfaces.

To further illustrate, cloud 150 can provide specific services for clients—namely, client A 110, client B 120, and client C 130. For example, cloud 150 can deploy a network or specific network components, configure links or devices, automate services or functions, or provide any other services for the clients. Other non-limiting example services by cloud 150 can include network administration services, network monitoring services, content filtering services, application control, WAN optimization, firewall services, gateway services, storage services, protocol configuration services, wireless deployment services, and so forth.

To this end, the clients can connect with cloud 150 through networks 160, 162, and 164, respectively. More specifically, client A 110, client B 120, and client C 130 can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Moreover, the clients can each include one or more networks. For example, 110, client B 120, and client C 130 can each include one or more LANs and VLANs. In some cases, a client can represent one branch network, such as a LAN, or multiple branch networks, such as multiple remote networks. For example, client A 110 can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A 110, client B 120, and client C 130 can each include one or more routers, switches, appliances, client devices, VMs, or any other devices.

Each client can also maintain links between branches. For example, client A can have two branches, and the branches can maintain a link between each other. Thus, in some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as security or VPN services. Cloud 150 can also maintain one or more links or tunnels to the clients. For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A 110, client B 120, and client C 130. To this end, client A 110, client B 120, and client C 130 can synchronize information with cloud 150. Cloud 150 can also manage and deploy services for the clients. For example, cloud 150 can collect network information about client A 110 and generate network and device settings to automatically deploy a service for client A 110. In addition, cloud 150 can update device, network, and service settings for the clients.

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or type of resources, which can be accessed and utilized by clients or tenants. The illustration and examples provided herein are for clarity and simplicity.

Moreover, as far as communications, packets (e.g., traffic and/or messages) can be exchanged among the various nodes and networks in the cloud architecture 100 using specific network protocols. In particular, packets can be exchanged using wired protocols, wireless protocols, security protocols, OSI-Layer specific protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

Figure 2:
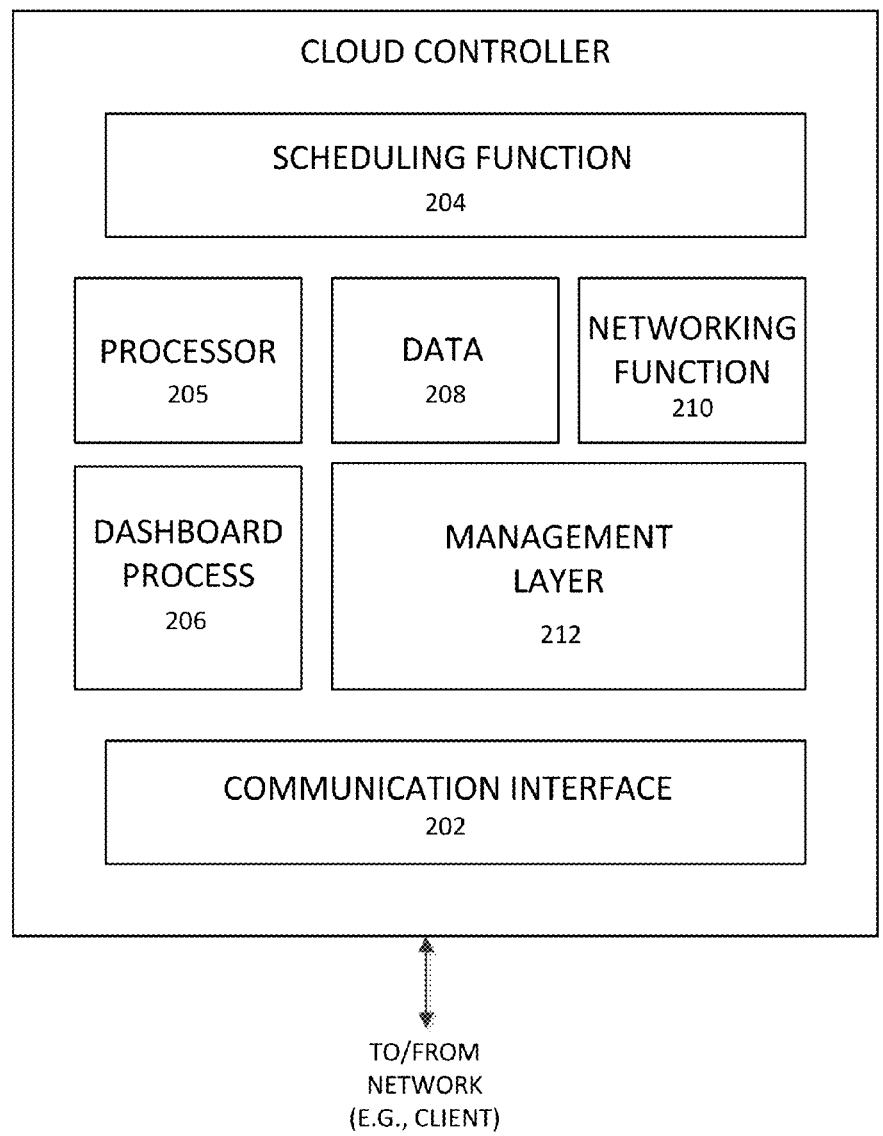
FIG. 2 illustrates a schematic block diagram of an example cloud service management system.

FIG. 2 illustrates a schematic block diagram of an example cloud controller 200. Cloud controller 200 can serve as a cloud service management system for cloud 150.

In particular, cloud controller 200 can manage cloud operations, client communications, service provisioning, network configuration and monitoring, etc. For example, cloud controller 200 can manage cloud service provisioning, such as cloud storage, media, streaming, security, or administration services. In some embodiments, cloud controller 200 can manage VMs; networks, such as client networks or software-defined networks (SDNs); service provisioning; etc.

Cloud controller 200 can include several subcomponents, including hardware and software components such as a scheduling function 204, a processor 205, a dashboard process 206, data 208, a networking function 210, a management layer 212, and a communications interface 202. The various subcomponents can be implemented as hardware and/or software components (e.g., processor 205, memory, data structures, etc.). Moreover, although FIG. 2 illustrates one example configuration of the various components of cloud controller 200, those of skill in the art will understand that the components can be configured in a number of different ways and can include any other type and number of components. For example, networking function 210 and management layer 212 can belong to one software module or multiple separate modules. Other modules can be combined or further divided up into more subcomponents.

Scheduling function 204 can manage scheduling of procedures, events, or communications. For example, scheduling function 204 can schedule when resources should be allocated from cloud 150. As another example, scheduling function 204 can schedule when specific instructions or commands should be transmitted to the network (e.g., one or more client devices). In some cases, scheduling function 204 can provide scheduling for operations performed or executed by the various subcomponents of cloud controller 200. Scheduling function 204 can also schedule resource slots, virtual machines, bandwidth, device activity, status changes, nodes, updates, etc.

Dashboard process 206 can provide an interface or frontend where clients can access, consume, and generally monitor cloud services. For example, dashboard process 206 can provide a web-based frontend where clients can configure client devices or networks that are cloud-managed, provide client preferences, specify policies, enter data, upload statistics, configure interactions or operations, etc. In some cases, dashboard process 206 can provide visibility information, such as views of client networks or devices, and even provide diagnostic information, discussed in greater detail below—e.g., dashboard process 206 can provide a view of the status or conditions of the client's network, the operations taking place, services, performance, a topology or layout, specific network devices, protocols implemented, running processes, errors, notifications, alerts, network structure, ongoing communications, data analysis, etc.

In some cases, dashboard process 206 provide a graphical user interface (GUI) for the client to monitor the client network, the devices, statistics, errors, notifications, etc., and even make modifications or setting changes through the GUI. The GUI can depict charts, lists, tables, tiles, network trees, maps, topologies, symbols, structures, or any graphical object or element. In addition, the GUI can use color, font, shapes, or any other characteristics to depict scores, alerts, or conditions. In some cases, dashboard process 206 can also handle user or client requests. For example, the client can enter a service request through dashboard process 206.

Data 208 can include any data or information, such as management data, statistics, settings, preferences, profile data, logs, notifications, attributes, configuration parameters, client information, network information, and so forth. For example, cloud controller 200 can collect network statistics from the client and store the statistics as part of data 208. In some cases, data 208 can include performance and/or configuration information. This way, cloud controller 200 can use data 208 to perform management or service operations for the client. Data 208 can be stored on a storage or memory device on cloud controller 200, a separate storage device connected to cloud controller 200, or a remote storage device in communication with cloud controller 200.

Networking function 210 can perform networking calculations, such as network addressing, or networking service or operations, such as auto VPN configuration or traffic routing. For example, networking function 210 can perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, networking function 210 can handle networking requests from other networks or devices and establish links between devices. In other embodiments, networking function 210 can perform queueing, messaging, or protocol operations.

Management layer 212 can include logic to perform management operations. For example, management layer 212 can include the logic to allow the various components of cloud controller 200 to interface and work together. Management layer 212 can also include the logic, functions, software, and procedure to allow cloud controller 200 to perform monitoring, management, control, and administration operations of other devices, cloud 150, the client, applications in cloud 150, services provided to the client, or any other component or procedure. Management layer 212 can include the logic to operate cloud controller 200 and perform particular services configured on cloud controller 200.

Moreover, management layer 212 can initiate, enable, or launch other instances in cloud controller 200 and/or cloud 150. In some embodiments management layer 212 can also provide authentication and security services for cloud 150, the client, controller 214, and/or any other device or component. Further, management layer 212 can manage nodes, resources, VMs, settings, policies, protocols, communications, etc. In some embodiments, management layer 212 and networking function 210 can be part of the same module. However, in other embodiments, management layer 212 and networking function 210 can be separate layers and/or modules.

Communications interface 202 allows cloud controller 200 to communicate with the client, as well as any other device or network. Communications interface 202 can be a network interface card (NIC), and can include wired and/or wireless capabilities. Communications interface 202 allows cloud controller 200 to send and receive data from other devices and networks. In some embodiments, cloud controller 200 can include multiple communications interfaces for redundancy or failover. For example, cloud controller 200 can include dual NICs for connection redundancy.

As discussed above, conventional monitoring approaches for cloud-based services often prove too rigid and insufficiently represent the dynamic and complex cloud-based environments. For example, some conventional monitoring analytics and assurance interfaces include individual, independent, and discrete views of data—e.g., tiles, dashlets, widgets, and the like. These views (and corresponding representations of data) often exist and behave in isolation from each other because they are typically defined, configured, and displayed based on, for example, static or primitive application-defined rules, arbitrary user preferences and actions, etc. Accordingly, relationships (implicit or explicit) and/or flow between these views quickly become ambiguous (e.g., as users change layout configuration parameters, etc.). In this fashion, conventional monitoring analytics and assurance interfaces make it difficult to dynamically generate coherent and holistic representations of data that highlight relationships, map to standard operational models, workflows, etc., and adapt to constantly changing consumer needs.

Accordingly, as discussed in herein, the techniques disclosed provide enhanced user interface systems for cloud-based monitoring and analytics that groups or clusters tiles in a single adaptive representation, such as a dashboard interface, for various states for cloud-based networks ("SMART TILES"). Moreover, in some embodiments, the enhanced user interface systems further provide dynamic context selection of network and cloud elements ("DYNAMIC CONTEXT SELECTION").

Smart Tiles

Figure 3:
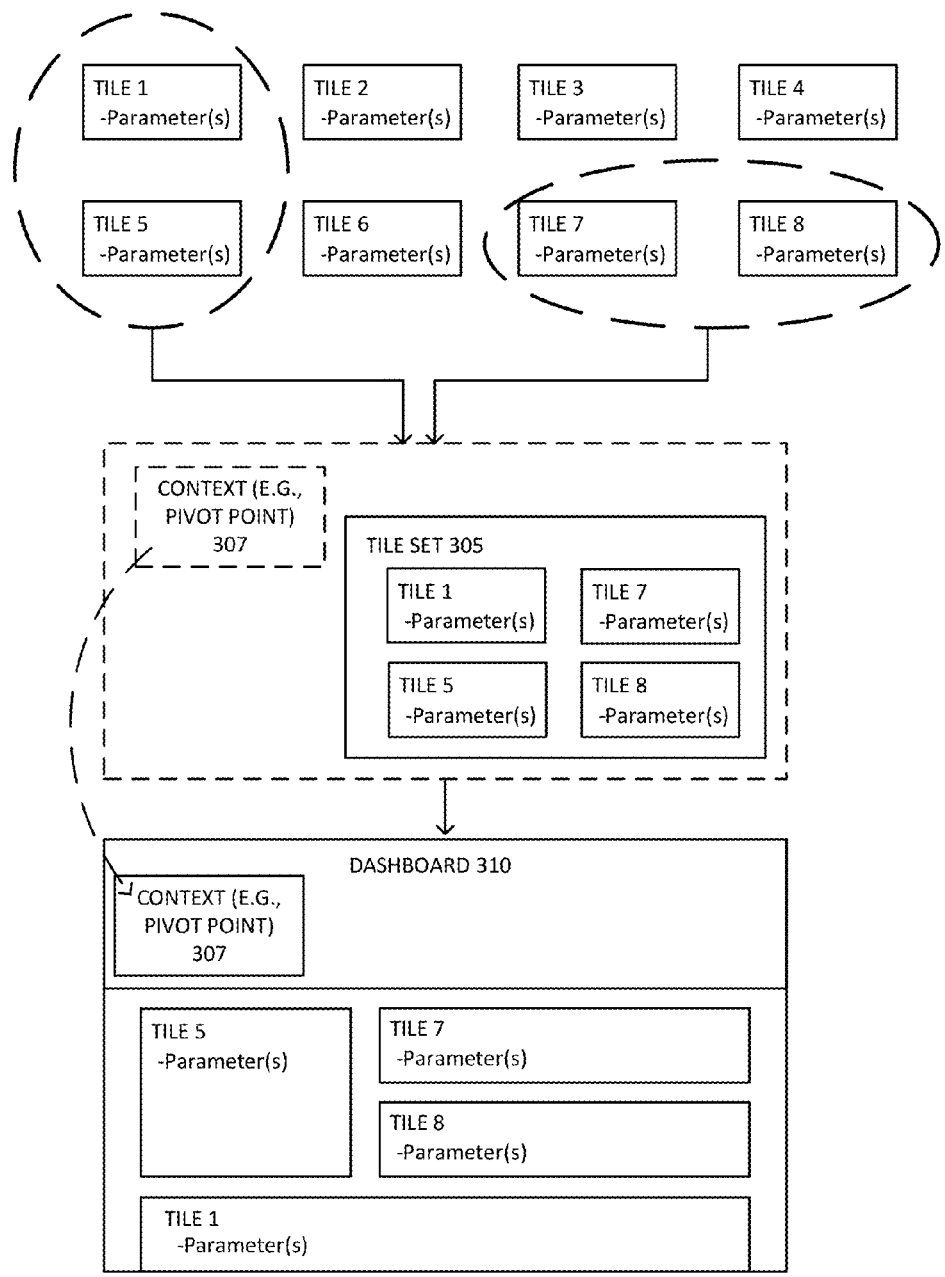
FIG. 3 illustrates an example architecture for defining a dashboard interface.
Figure 4A:
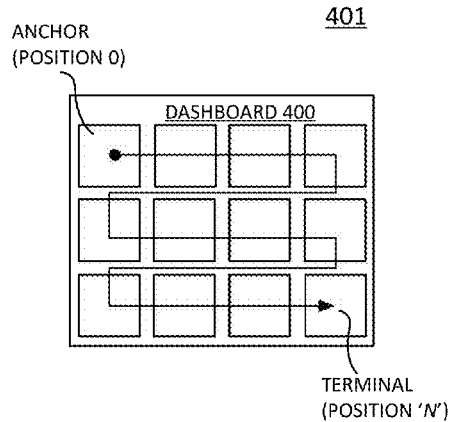
FIGS. 4A, 4B, 4C, and 4D illustrate various tile flows for a dashboard interface.
Figure 4B:
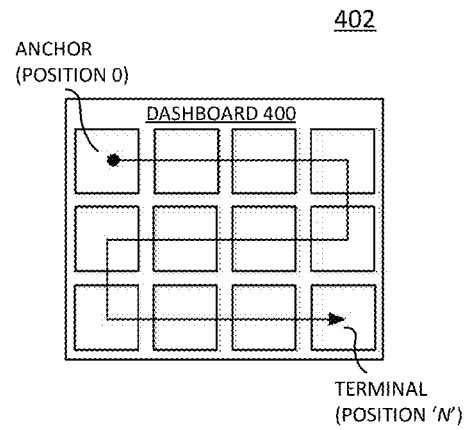
Figure 4C:
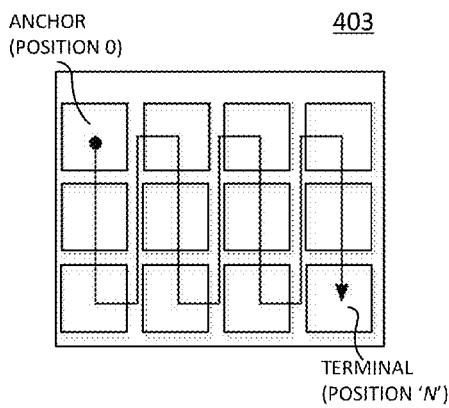
Figure 4D:
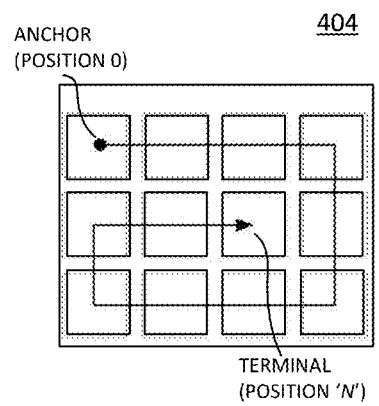

With respect to the adaptive representation of cloud-based resources and improved analytics monitoring, FIG. 3 illustrates an example architecture 300 that defines a dashboard interface 310. In particular, architecture 300 provides various tiles—e.g., labeled as "tile 1"-"tile 8"—with each tile having one or more parameters associated therewith. These parameters include, for example, data regarding cloud-based networks and cloud-based services such as system objects, key performance indicators (e.g., usage, availability, efficiency, etc.), network servers, performance statistics, network analytics, Quality of Service (QoS) parameters, and the like. Further, the parameters can vary in data aggregation level (e.g., granularity), discussed in greater detail below. As used herein, the term "tile", "smart tile(s)" and "tile object" generally refers to a tile object, presented by a dashboard interface, and the term "tile set" is used synonymously to refer to a grouping of tiles.

Specific sets or clusters of tile 1-tile 8 are grouped together to form a tile set 305, which is used to define a dashboard interface 310. As shown, tile set 305 is further indexed or otherwise linked with a context 307 (e.g., a pivot point) discussed in greater detail in the DYNAMIC CONTEXT SELECTION section, below.

In preferred embodiments, selecting or grouping specific tiles together to form corresponding tile sets—here, tile set 305—is performed based on workflows, domain knowledge, network model integration, and the like. Notably, some workflows such as domain-specific operational workflows (e.g., TAC troubleshooting scripts, cloud services design or deployment blueprints, audit policies, etc.) provide methodologies to logically analyze systems, components, and the like. Operatively, dynamic network conditions may call or trigger a workflow. In turn, the dashboard interface retrieves a tile set or tile display set associated with the workflow.

Moreover, adjusting context 307 adjusts a displayed or viewable tile set for dashboard interface 310. For example, adjusting context 307 causes dashboard interface 310 to retrieve and display additional and/or different tile sets. In some embodiments, one or more tiles of a tile set can serve as a context 307 for a subsequent tile set. For example, a user selection of tile 1 of tile set 305 can cause other tiles 2, 3, and 4 to be displayed (assuming tiles 2, 3, and 4 form an additional tile set linked to tile 1).

Dashboard interface 310 also defines a display position, which is assigned to each tile of tile set 305. The display position for each tile can be determined, for example, by a priority and/or weighting, which can be based on, for example, a workflow, a bin-packing algorithm, domain-based semantic graphs, and the like. Further, the assigned display position can be transient or persistent—e.g., saved, re-used, extended, etc.

In addition, certain display properties (e.g., order, size, content, visualization type, etc.) may also be defined for each tile. Similar to the display position, the display parameters or properties can also vary according to a priority or weighting (e.g., a hierarchical, time-aware parent context, a user selection, an application, availability of related services and data, etc.).

Operatively, dashboard interface 310 (including tiles of tile set 305) is provided to a display device such as a client device, to cause the client device to display each tile of tile set 305 according to the respective display position and the respective display property.

FIGS. 4A, 4B, 4C, and 4D, collectively, illustrate display positions defined by a dashboard interface 400. The illustrated display positions represent various tile flows 401, 402, 403, and 404 for dashboard interface 400. Notably, each tile flow begins at an "anchor position 0", and terminates at "terminal position N". As discussed above, each display position for a corresponding dashboard can be assigned depending on, for example, a type of information to be displayed, culture of the user (e.g., reading left to right vs. right to left), a screen size for a corresponding display device, and the like. For example, a spiral-ordered layout shown in FIG. 4D may be conducive to an interface environment in which the user may be visually scanning around multiple datasets to present an overall picture.

Figure 5:
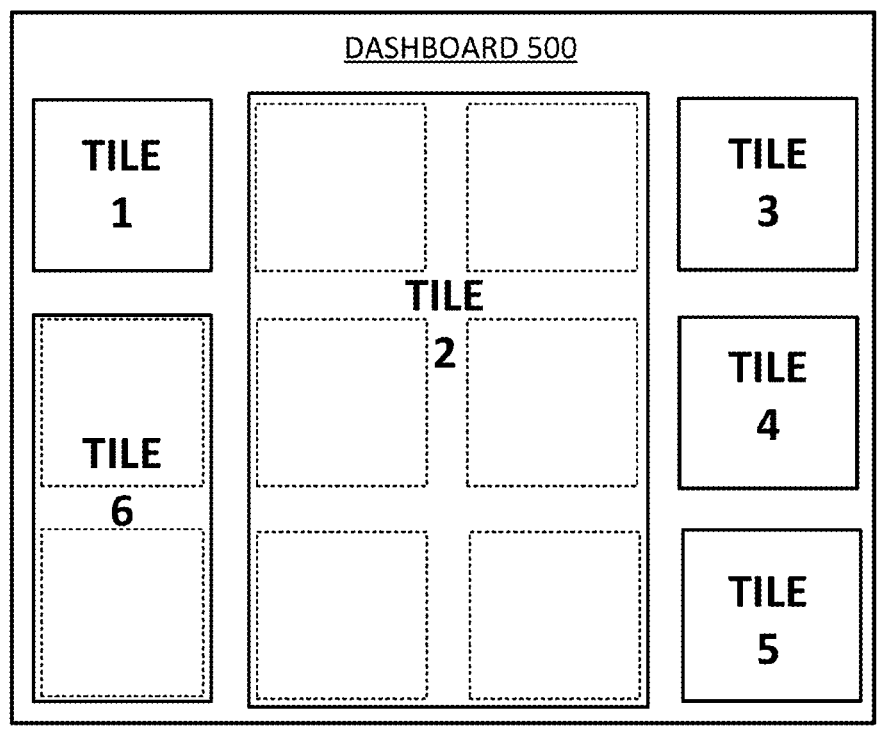
FIG. 5 illustrates a schematic block diagram of a dashboard interface, showing tiles assigned to various display parameters.

FIG. 5 illustrates a schematic block diagram of a dashboard interface 500 showing tiles assigned to various display parameters. Here, tiles 1-6 can be assigned different size display properties—e.g., size, granularity, etc.—which can vary according to a priority or weight assigned to each tile.

Figure 6:
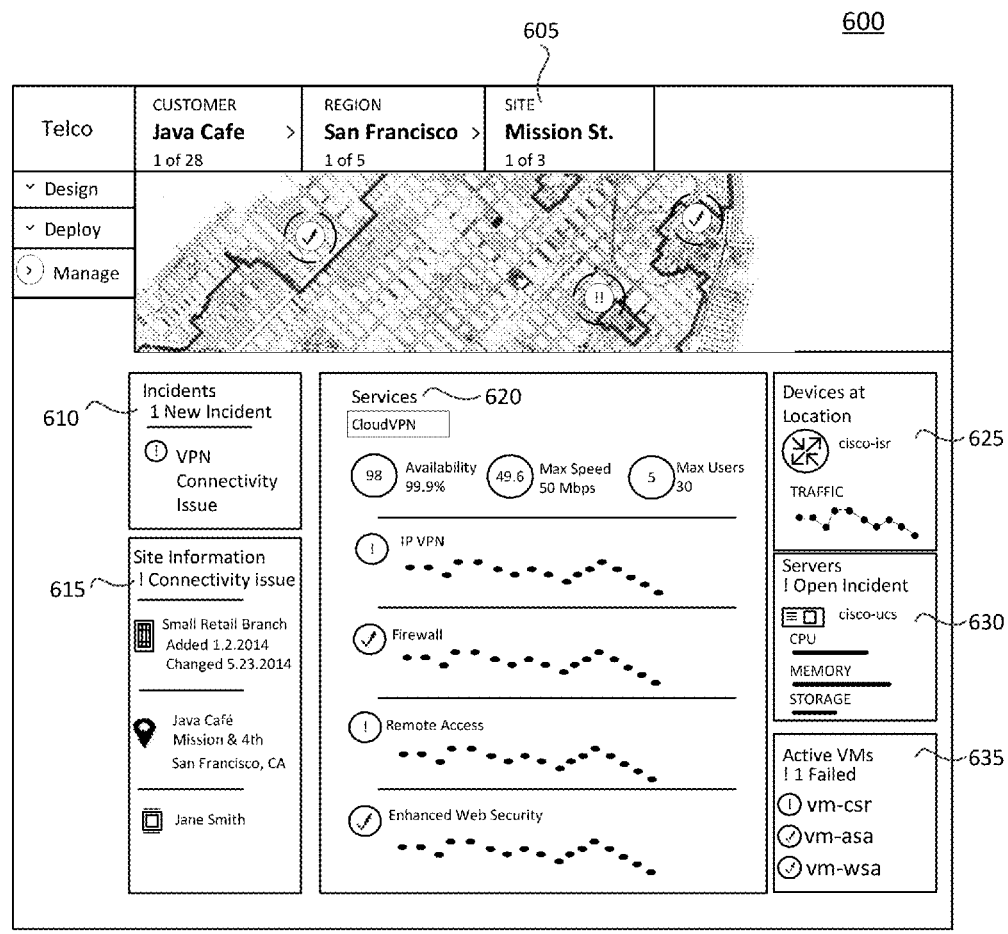
FIG. 6 illustrates an example of a dashboard interface, organized according to a context.

FIG. 6 illustrates an example of a dashboard interface 600, organized according to a context 605 that includes a customer ("Java Café"), region ("San Francisco"), and site ("Mission St."). As shown, a tile set including tile 610 (e.g., an anchor point tile), 615, 620, 625, 630, and 635, is linked to context 605. Operatively, dashboard interface 600 can determine a context—here, context 605—based on, for example, dynamic network conditions (e.g., an "incident"), a troubleshooting workflow, and the like. A tile flow for dashboard interface 600 may be selected based on a logical awareness of context 605 and the underlying tile set. In this case, the tile flow is similar to that shown in FIG. 5, with an anchor point tile (e.g., the 610) located in an upper-left corner (e.g., based on the locale attributes of a Western audience—written text and content generally flow from left to right).

In addition, tiles 610-635 are also assigned a weight or priority based on a workflow, domain knowledge, and/or a OSS/BSS model integration. As discussed above, respective weight for each tile is used to determine a display position as well as one or more display properties (e.g., size, granularity, etc.) for a corresponding dashboard interface. For example, the weight or priority emphasized by dashboard interface 600 emphasizes "incidents" corresponding to tile 610 more heavily than remaining tiles 615-635. Accordingly, tile 610 is assigned to a first display position on dashboard interface 600.

Operatively, dashboard interface 600 identifies a new object instance availability for "incidents" (corresponding to tile 610), which is triggered by a dynamic network condition or event. As a result, tile 610 is placed in the first display position of dashboard interface 600. Further, since only one incident occurred, the tile size and corresponding data visualization is relatively "small". In contrast, tile 620 corresponding to "Services" includes a representation of the CloudVPN Full bundle (e.g., four underlying services). Tile 620 is also identified as a primary object based on, for example, an integrated OSS/BSS awareness and is assigned a high weight or priority.

As illustrated, two services are currently experiencing issues and are operating in an abnormal state. As a result of this abnormal state, tile 620 (services) is assigned a second display position—here, near a center of dashboard interface 600. Further, due to the richness and value of available data given for context 605, tile size and data visualization for tile 620 is set to "large". Tiles 625, 630, and 635 are assigned to respective positions on the right side of dashboard interface 600 and present valuable contextual information for objects of interest at the incident site—namely, Devices, Servers, and Active VMs. For example, tiles 625, 630, and 635 can be assigned to a respective display position for dashboard interface 600 according to a hierarchical model (e.g., a semantic graph discussed in greater detail below). In this example, tiles 625, 630, and 635 are assigned positions below or after more heavily weighted tiles 610 and 620 (e.g., Incidents and Services), and embody a "small" tile size and data visualization pattern given the quantity of relevant data available. Further, tile 615 "Site Information" is also assigned a low weighted priority for the context because it contains supplementary information such as site attributes. Here, tile 615 is assigned the lowest display position in this instance, and provides a "standard" tile size and data visualization given the quantity of data.

Dynamic Context Selection

As discussed above, the techniques disclosed herein provide for dynamic context selection of network and cloud elements. Generally, context selection refers to a scope of view (e.g., displayed tiles, tile sets, etc.) for a dashboard interface and provides a vehicle for users to modify, dynamically, such scope of view using one or more pivot points (e.g., context objects, sub-context objects, etc.). As used herein, the terms "context" and "context object" generally refers to a view or visualization of network elements displayed by a dashboard interface.

Figure 7:
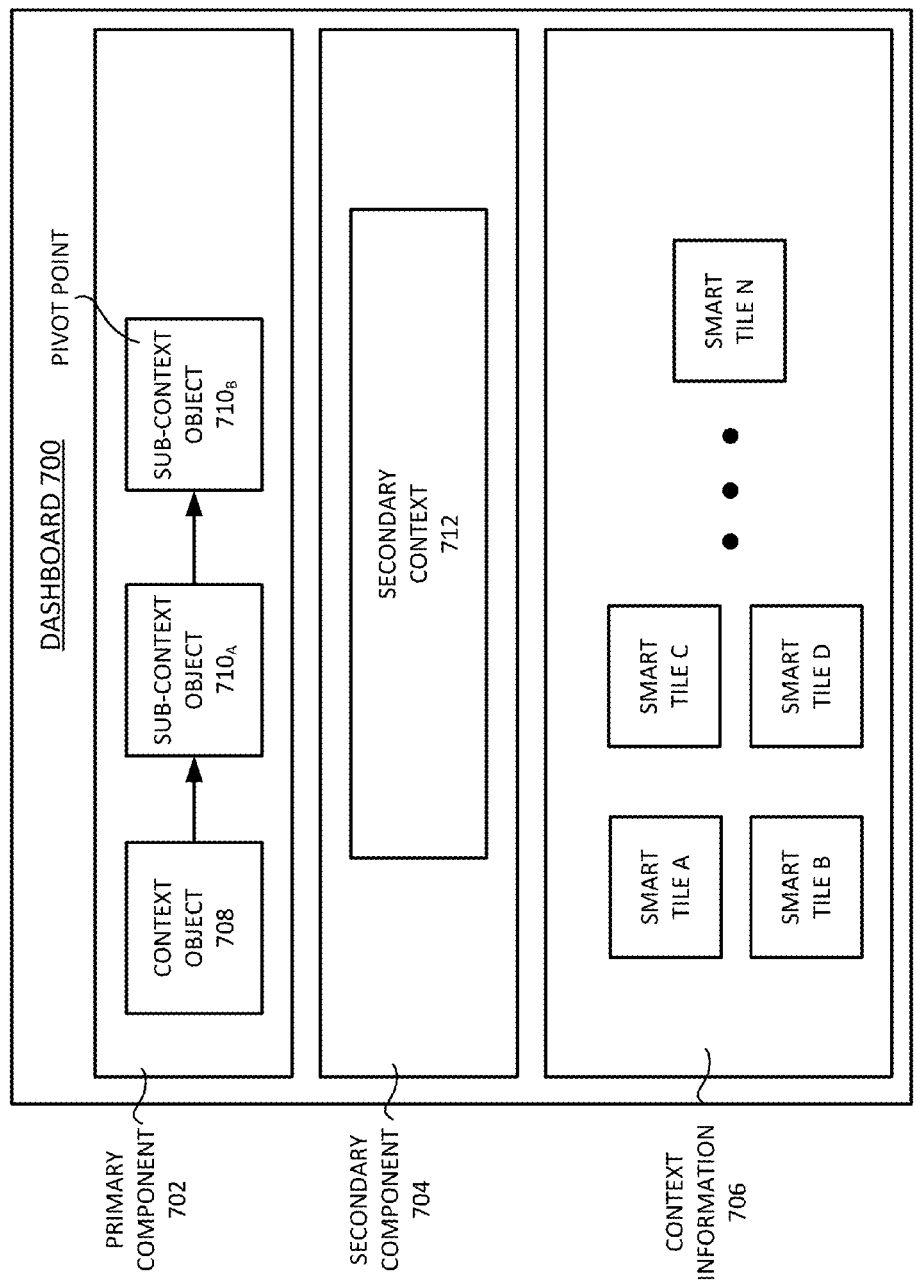
FIG. 7 illustrates a schematic block diagram for a dashboard interface, showing dynamic context selection.

Referring to the figures, FIG. 7 illustrates a schematic block diagram for a dashboard interface 700 showing dynamic context selection. As shown, dashboard interface 700 includes dynamic context objects (e.g., corresponding to network or cloud elements) that seamlessly links elements associated with a cloud services provider. These dynamic context objects can include, for example, information related to customers, locations, regions, systems, system components, network resources, routers, servers, virtual machines, incidents, etc.

Dashboard interface 700 further includes a primary component 702, a secondary component 704, and context information 706 (e.g., tiles forming a tile set). Primary component 702 can include one or more interactive user interface elements or objects (e.g., context objects). Here, primary component 702 includes a context 708 object for context selection and sub-context 710A and 710B objects for sub-context selection. As discussed in greater detail below, context 708 and/or sub-context 710A/710B set a scope of display for the dashboard. Notably, in some embodiments, the object for context 708 and/or sub-context 710A/710B can represent one or more elements. For example, context 708 can represent a single customer, while sub-context 710A can represent a group of similar customer elements (e.g., all network servers for the single customer). Generally, context selection objects shown in primary component 702 become increasingly granular in scope advancing from context 708 to sub-context 710A, 710B, and so on.

In one embodiment, a default element or category is assigned for context 708 (e.g., when dashboard process 206 initially presented to a user, etc.). In addition, the default element or category can be determined by a user selection (e.g., a user setting a preferred default context), a network condition or event, and/or the default element or category may be determined based on a context of a prior dashboard interface session (e.g., last known context for a user). In yet another embodiment, the default category for context 708 may be selected dynamically when dashboard process 206 is launched based on present network conditions. For example, processor 205 (executing dashboard process 206) may detect that a particular customer is experiencing network connectivity issues and automatically configure context selection 708 to that particular customer.

As discussed above, primary component 702 can also include sub-contexts 710A, 710B . . . 710N (collectively '710'), to provide additional granularity for the overall context or scope of view for dashboard interface 700. Generally, each sub-context 710 is associated with a previously selected "parent" context or sub-context. In this fashion, sub-context selection follows a hierarchical model (high level to more granular level) as additional sub-context objects are selected. Put differently, context 708 can be a parent context object of sub-context 710A, and sub-context 710A can be a parent context object of sub-context 710B, and so on.

In one example, context 708 can correspond to a list of customers; i.e. 'High-End Coffee,' 'Burger Joint,' 'Sports Bar,' etc. Upon receiving user input to select 'High-End Coffee' as the customer for context 708, alternatives for sub-context 710A can be dynamically determined. For example, sub-context 710B can correspond to the 'High-End Coffee' locations, regions, services, incidents, network equipment, etc. Upon receiving an input for sub-context 710A, alternatives for sub-context 710B can be dynamically determined. Continuing with the previous example, if the 'San Francisco' region of 'High-End Coffee' is selected as sub-context 710A, then the options for sub-context 710B can be dynamically determined and presented within dashboard interface 700. For example, the sub-context 710B may include 'High-End Coffee' locations within the San Francisco region, network equipment serving 'High-End Coffee' within the San Francisco region, network incidents affecting 'High-End Coffee' within the San Francisco region, etc. One that is skilled in the art will recognize that the categories and iterations for context and sub-context selection can be adapted and are not limited to a particular number.

Linked user interface elements within primary component 702 can include any number of context and sub-context objects. As additional sub-context is selected, additional objects are linked to the previous context objects. Further, a selected context (e.g., the most specific context selection object selected within primary component 702) serves as a pivot point for dashboard interface 700. Accordingly, sub-context 710B is the pivot point for dashboard interface 700 because sub-context 710B corresponds to the most specific sub-context selected by the user. Similarly, when dashboard interface 700 is initiated with only context 708, context 708 serves as the pivot point for dashboard interface 700.

Context and sub-context selections made in primary component 702 can be used to dynamically select data (e.g., figures, images, diagrams, network topologies, schematics, maps, etc.) for display within secondary component 704 and also within context information 706. For example, secondary component 704 can include secondary context 712 which provided a graphical representation of an active selection or pivot point (e.g., sub-context 710B) from primary component 702. In one embodiment, the secondary context 712 includes a map illustrating a location associated with the current pivot point. For example, if sub-context 710B is configured to focus on a particular location for 'High-End Coffee,' the secondary context 712 can show a map for the particular location. The map can be interactive, allowing the user to zoom in and out as well as navigate to surrounding areas. Alternatively, the secondary context 712 can be configured to show network topology for the selected sub-context. The network topology can include all of the components (routers, servers, etc.) that are associated with the services being provided to the particular customer. The secondary context 712 can also include selectable interactive component that can be used to further explore related context items. Furthermore, secondary component 704 can include additional items and is not limited only to secondary context 712. Secondary component 704 can also be minimized or deactivated to provide additional space or additional computing resources for other items in dashboard interface 700.

Context and sub-context selections for primary component 702 can also be used to select appropriate tile sets for display as context information 706. In one embodiment, context information 706 can be presented using "smart tiles" such as smart tile A, smart tile B, smart tile C . . . smart tile N (collectively "smart tile set"). The smart tile set can provide further graphical representations and details related to the pivot point of primary component 702. For example, tiles of the smart tile set can include 'incidents,' 'site information,' 'services,' 'devices,' 'servers,' 'virtual machines,' 'event logs,' 'network topology,' 'performance summary,' 'service health,' 'loading,' etc. A service provider can use dashboard interface 700 to intelligently select and navigate through contexts and sub-contexts.

In some embodiments, selection of one or more smart tiles can be selected to re-define the pivot point. For example, smart tile A may represent a particular server associated with a customer location, which customer location is the current pivot point. A user may select smart tile A and dashboard interface 700 will subsequently present or append an additional sub-context selection box in primary component 702. In doing so, the pivot point for dashboard interface 700 is changed based on user selection. Alternatively, smart tile A can be selected to be the top-most hierarchical component in primary component 702. For example, dashboard interface 700 can clear all of the sub-context items present in primary component 702 and configure context 708 to correspond with a selection of smart tile A. As discussed above, the pivot point can then correspond to a singular context object 708 and the corresponding options for sub-context 710A can be determined dynamically.

Figure 8:
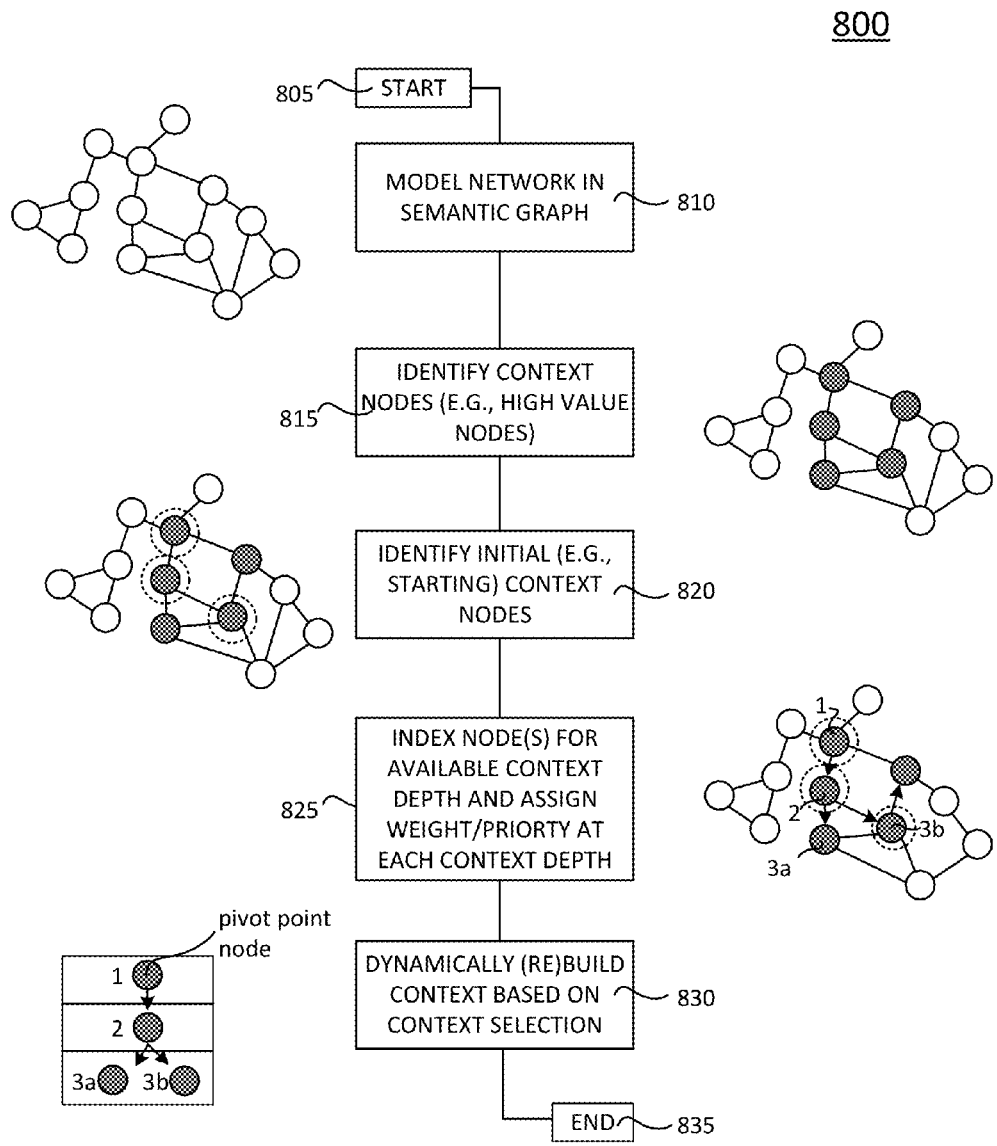
FIG. 8 illustrates an example procedure to establish a framework for dynamic context selection.

FIG. 8 illustrates an example procedure 800 to establish a framework for dynamic context selection. Procedure 800, as illustrated, also provides a representation of a semantic graph of network nodes for each step.

Procedure 800 begins at step 805 and continues to step 810 where network nodes are modeled according to a system ontology in a semantic graph. The semantic graph provides a logical framework of interconnected network nodes and provides naming and definition for node types, properties, and interrelationships. For example, as shown, each network node is connected to one or more other network nodes based on relational links (e.g., domain-based relationships, etc.). The network nodes can represent, for example, one or more network elements, including filter categories, particular hardware/software components (e.g., servers, virtual machines, processes, etc.), customer names, locations, sites, regions, and the like.

Once each network node is modeled in the semantic graph, one or more context nodes are identified in step 815. Context nodes (e.g., high value nodes) are identified based on, for example, a number of relational links between the node and subsequent nodes. Further, the context nodes may correspond to context objects such as context 708, and/or sub-context 710, discussed above.

Procedure 800 continues to step 820, where initial or starting point context nodes are identified. For example, such initial or starting point context nodes may correspond to a pivot point node (e.g., the pivot point for dashboard interface 700).

Next, in step 825, each context node is indexed to an available context depth relative to a respective pivot point node and further, nodes of the same depth are assigned a relative weight or priority. In this fashion, the context node can be ordered in a hierarchal model or table according to the respective weight/priority to create a dynamic selection hierarchy.

As shown, initial context node is assigned a depth of 1 (e.g., an initial starting point for a dashboard interface), while subsequent context nodes, relative to the initial context node, are assigned to a depth of 2 and 3(a/b). For example, from the perspective of initial context node 1, node 2 is an available sub-context node that can be selected from node 1. Similarly, from the perspective of node 2 (e.g., indexed at a depth of 2), nodes 3a and 3b are available sub-context nodes that can be selected from node 2. With respect to nodes 3a and 3b, node 3a is further assigned a higher priority or a greater weighting than node 3b. In this fashion, nodes 3a and 3b are weighted so that available selections (here, sub-context selections) are be prioritized, tagged, or ordered in the dashboard interface.

Operatively, as discussed above, a user can select a context object to set a scope of view for the dashboard interface. Additionally, the user can refine the context by selecting one or more sub-context objects as a new pivot point for the dashboard interface (e.g., increasing granularity of the dashboard interface display). Here, in step 825, each node is indexed according to a depth (e.g., graph traversal depth) and further, at each depth, each node is assigned a weight/priority according to a dynamic selection hierarchy to establish one or more sub-context objects relative to the initial context node (e.g., sub-context 710).

Operatively, procedure 800 dynamically builds (or re-builds) the context or scope of view for the corresponding dashboard interface based on the context (or sub-context) selection. As shown, the initial context node (with a depth of 1) is selected as the pivot point node (e.g., context object 708). Once selected, the corresponding dashboard may be further refined by additional sub-context nodes (e.g., sub-context 710A)—here a single available sub-context node is available (e.g., with a depth of 2) relative to context of the initial context node.

Similarly, once a sub-context is selected, the scope of view for the dashboard interface is refined according to the sub-context. From the node indexed at a depth of 2, additional sub-context nodes are available—here, there are two additional sub-context nodes indexed at a depth of 3 (e.g., sub-context object(s) 710B). Moreover, the two additional sub-context nodes at the depth of 3 are prioritized or weighted relative to each other, as discussed above.

Although the above procedure 800 is described with reference to a single initial context node (assigned as the pivot point node), it is appreciated that the same procedure applies for each context node. In this fashion, the context or scope of view for the corresponding dashboard interface is dynamically built or re-built based on context selection. Further, additional sub-context nodes are available to refine a context according to an indexed depth, and such sub-context nodes may be prioritized or weighted for selection at their respective depth according to the dynamic selection hierarchy.

Figure 9:
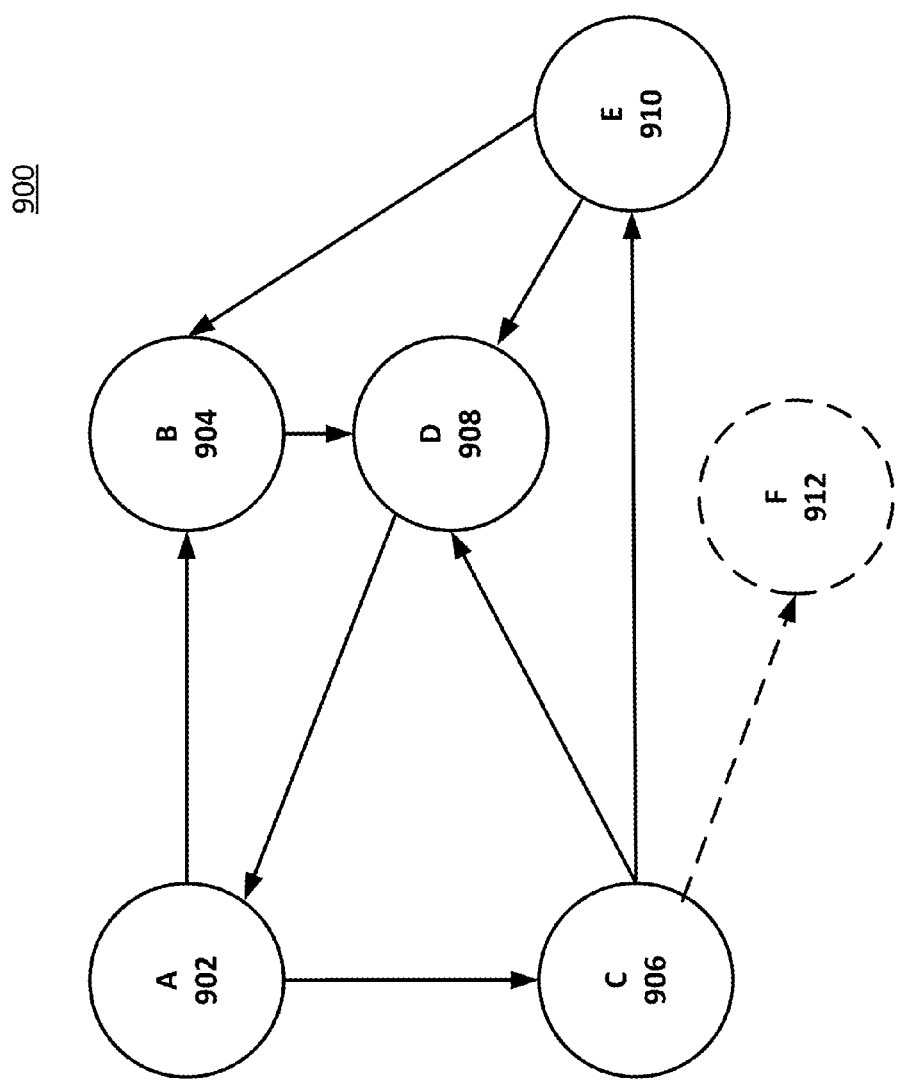
FIG. 9 illustrates a directed sub-graph, showing a dynamic selection hierarchy for deriving and presenting context objects for a dashboard interface.

For example, referring to FIG. 9, a directed sub-graph 900 provides another example of a dynamic selection hierarchy that can be used to derive and present context and sub-context objects for dashboard interface 700. As shown, node A 902 corresponds to an initial context node (e.g., a head node), which may be presented by dashboard interface 700 as a default condition, as discussed above. Assuming the current context for dashboard interface 700 is set by node A 902, the techniques disclosed herein dynamically identify node B 904 and node C 906 as potential sub-context nodes relative to node A 902.

Operatively, a user can further select node C 906, causing dashboard interface 700 to identify other related nodes—here, node D 908 and node F 912. Directed sub-graph 900 can be updated or rebuilt dynamically as network conditions change. For example, node F 912 can correspond to an incident or an outage that is temporary and subsequently resolved. Thus, node F 912 and the paths the corresponding paths are shown using dashed lines to represent the dynamic nature of the directed sub-graph.

A user may also decide to define a new pivot point for the dashboard interface by selecting a different initial context node (i.e. a different context object), as discussed above. For example, node E 910 can be selected as the initial context node assigned as the pivot point for the dashboard interface. Once selected, the dashboard interface identifies node D 908 and node B 904 as potential sub-context nodes. As discussed above, dashboard interface 700 presents options for context selection based on user configurations, optimization, best practices, workflows, etc. For example, a starting point context of node E 910 may direct the user to node A 902 via node D 908 (E-D-A) based on known best practices. Alternatively, optimization techniques may recognize that node B 904 presents options that are important to the user, therefore the directed sub-graph 900 may direct the user to node A 902 via node B 904 and node D 908 (E-B-D-A). As the network conditions and topology changes, the directed sub-graph can continue to evolve so as to present context and sub-context in a streamlined manner.

Figure 10:
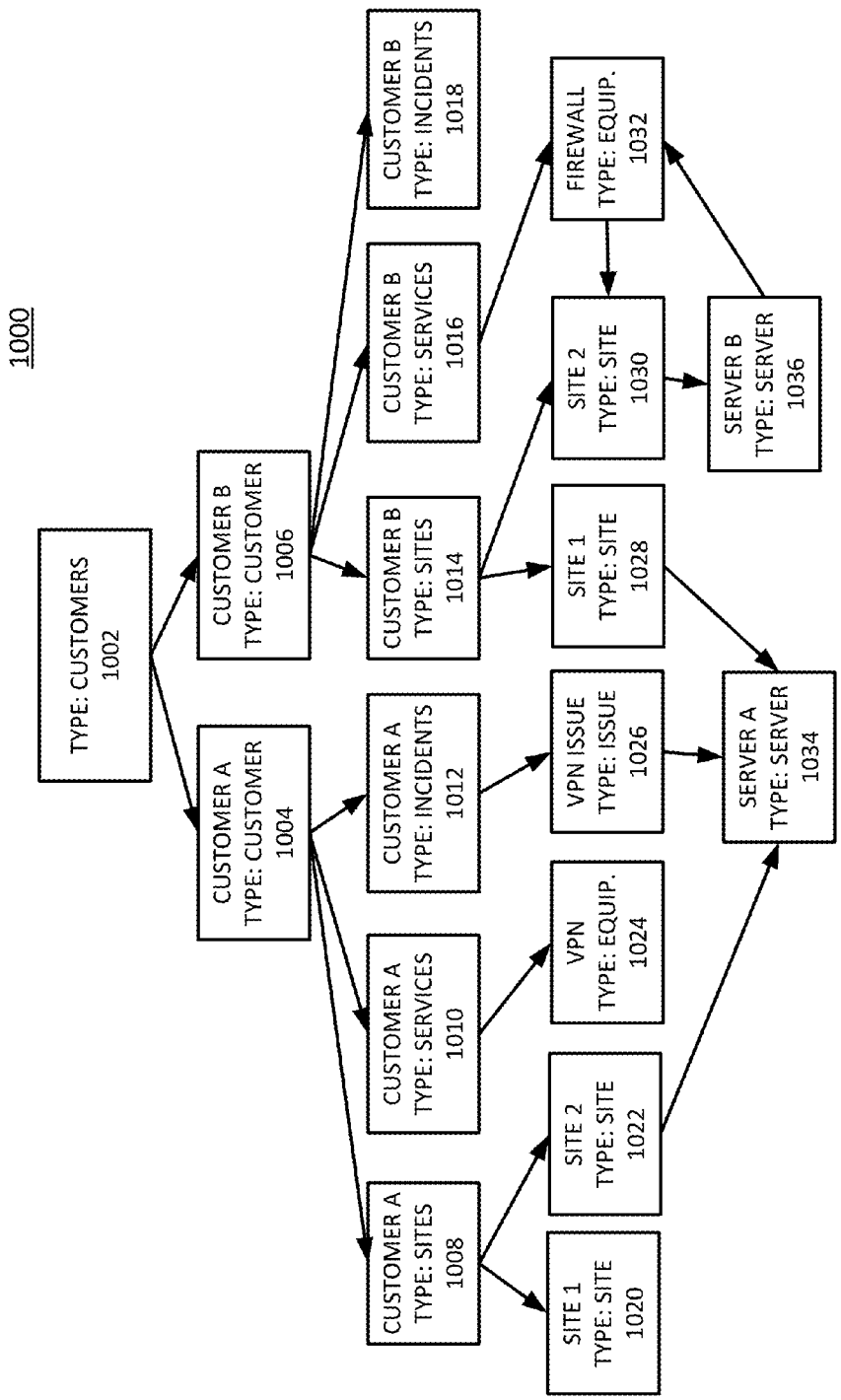
FIG. 10 illustrates an example active sub-graph, showing relationships or links between context categories and domain object elements.

FIG. 10 illustrates an example active sub-graph 1000, showing relationships or links for context categories (e.g., corresponding to context nodes or context objects) and domain object elements. The categories illustrated by active sub-graph 1000 are preferably used as context selection objects—e.g., context 708, sub-context 710, etc. For example, active sub-graph 1000 includes customers 1002 as a primary context selection (e.g., context selection 708)—when a user selects customers 1002 as the initial context node for context selection of the dashboard interface, corresponding sub-contexts become available (e.g., based on the dynamic selection hierarchy discussed above). Notably, each node may be further associated with an object type, which may also be used to determine corresponding available sub-contexts. For example, if a user selects another object type (e.g., a region, etc.) as the pivot point, a different set of corresponding sub-contexts become available.

As shown, relative to head node customers 1002, two sub-context objects are available as sub-context objects or subsequent pivot points—here, customer A 1004 and customer B 1006. As discussed above, selection of a subsequent pivot point further refines the scope of the view of the current dashboard interface. When the user selects the sub-context object corresponding to customer A 1004, additional sub-contexts are determined for customer A 1004 (illustrated by sub-context objects customer A sites 1008, customer A services 1010, and customer A incidents 1012). Likewise, upon selection of customer B 1006, corresponding sub-contexts are determined and represented by customer B sites 1014, customer B services 1016, and customer B incidents 1018.

As a user selects further sub-contexts, additional sub-contexts are determined based on, for example, present conditions or events within the network. For example, selection of customer A incidents 1012 generates a further sub-context of VPN issue 1026. On the other hand, selection of customer B incidents 1018 does not include any further sub-context, signifying that no issues are presently associated with customer B. Further exploration of VPN issue 1026 reveals a sub-context of server A 1034. Accordingly, a network service operator can advantageously utilize the contexts and sub-contexts to navigate and trouble-shoot the network in a real-time fashion.

Furthermore, as discussed above, a user may re-pivot the dashboard interface by selecting a sub-context as the pivot point. For example, having navigated to the sub-context of server A 1034 by way of customer A's VPN issue, the user can select server A 1034 as the pivot point and determine what other customers, services, issues, etc. are associated with server A 1034. In this example, pivoting on server A 1034 would allow the user to identify sub-contexts such as customer A site 2 1022 and customer B site 1 1028, among others that are not illustrated.

Similarly, a user may select to the primary context as servers (not shown), which could then generate available sub-contexts categories associated with server A 1034 and server B 1036. Selecting server B 1036, the user would be presented with sub-contexts corresponding to customer B sites (i.e. customer B site 2 1030) and customer B services (i.e. customer B firewall 1032).

Thus, the context and sub-contexts presented as part of the primary component 702 of dashboard interface 700 are associated with an underlying active directed sub-graph. The initial context node of the sub-graph can correspond to the user defined or default starting point for context selection (e.g. 'customers') and subsequent sub-context nodes, once selected, serve as the pivot point or the anchor point for the dashboard interface 700. As mentioned above, when only a single node is selected, it is both the initial context node and the sub-context node, and assigned as the pivot point for the dashboard interface 700.

In this fashion, active sub-graphs such as active sub-graph 1000 can be dynamically derived from an application level and domain-specific (i.e. networking and cloud) ontologies and corresponding semantic graphs (e.g., procedure 800).

The user or the application can change the direction of an active graph or jump to a different start or initial context node at any decision point.

Additional active graphs are dynamically rebuilt to provide available choices based on new pivot points, and can be optimized in real-time based on the overall state of the system, prioritized sub-states, and best practice operational workflows. The prioritized sub-states and the operational workflows can be user configurable and can also be optimized by the system based on historical data. The optimization can result in different list of options or different order for presenting hierarchical contexts and sub-contexts.

Figure 11:
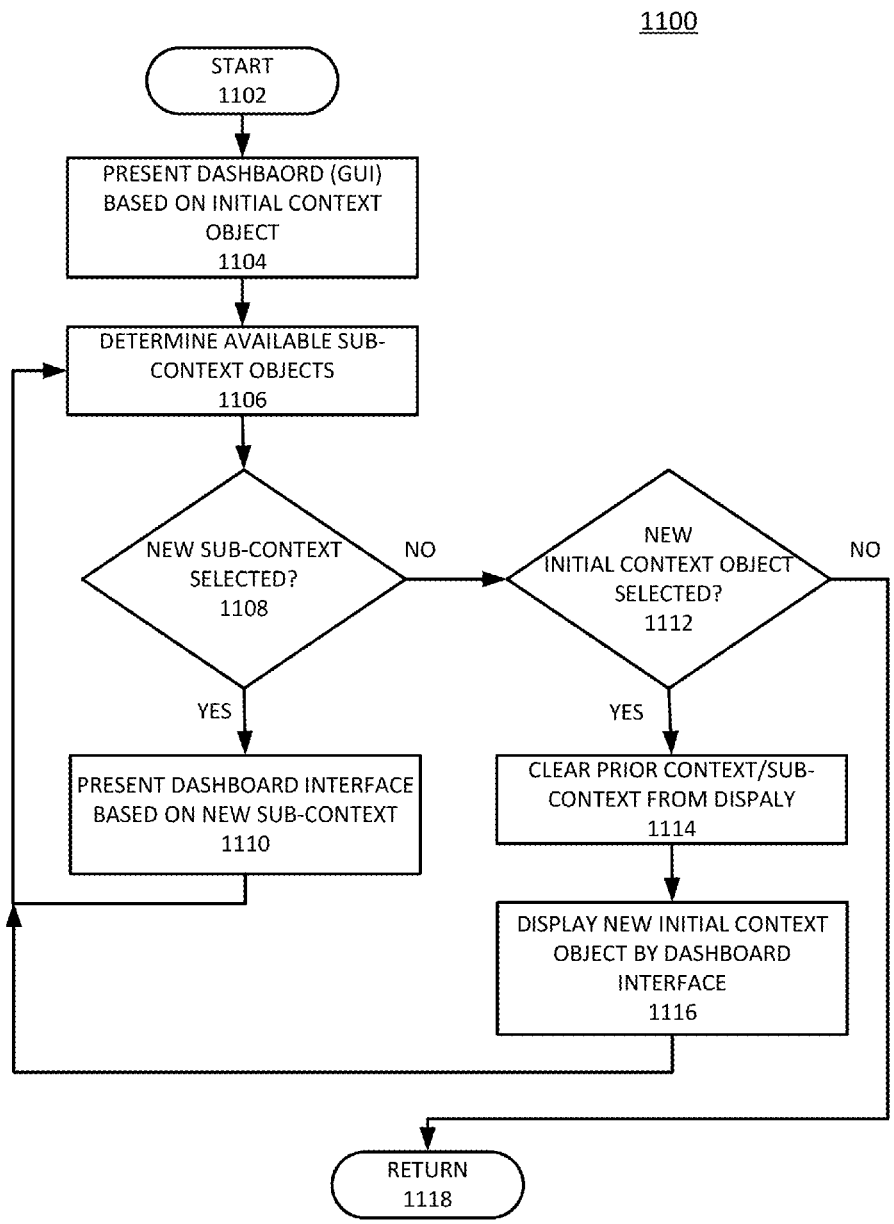
FIG. 11 illustrates an example procedure for dynamic context selection.

FIG. 11 illustrates an example procedure 1100 for dynamic context selection according to one or more embodiments of this disclosure (e.g., in accordance with a dashboard process 206). For the sake of clarity, the flowchart is described from the perspective of cloud controller 200 (shown in FIG. 2). The steps outlined herein are exemplary and can be implemented in any combination thereof, including combinations that exclude, add, or modify certain steps.

Procedure 1100 particularly illustrates steps to generate a dashboard or user interface that provides dynamic context selection of network and cloud elements. The procedure begins at step 1102 and continues to step 1104 in which the user interface is generated based on an initial singular context object. The initial singular context object can be a default context set up by a system administrator or according to user preferences. Alternatively, the default context can be selected based on current network conditions and events. Notably, the initial singular context object can act as the pivot point for the scope of view for the dashboard. That is, elements or objects (e.g., secondary component 704, context information 706, etc.) are displayed according to the selected pivot point. In one example, the initial context object can be a list of customers or a particular customer. Alternatively, the singular context object can be a geographic region, a server, a datacenter, etc.

Procedure 1100 continues to step 1106 where available sub-context selections are determined. The available sub-context selections correspond to data or categories that are related to the initial singular context object (e.g., mapped to domain object instances, discussed above). For example, if the initial context object is selected as 'customers,' the available sub-context selections can include a list of customers. In one embodiment, the available sub-context selections can be determined according to dynamic selection hierarchy categories, discussed above. Further, as discussed above, cloud controller 200 can dynamically update available sub-context objects according to changes in network conditions as well as optimization techniques according to user-defined rules or an intelligent "self-learning" system.

Procedure 1100 continues to step 1108 where a user selects a sub-context object to re-pivot the dashboard interface (e.g., the sub-context object is assigned as a new pivot point). For example, if the user selects a sub-context object, procedure 1100 continues to step 1110 where the dashboard interface is rendered according to the selected sub-context. In one embodiment, the dashboard interface includes a secondary component displaying, for example, a geographic map or network topology based on the selected sub-context object. In another embodiment, the dashboard may include a section for context information with additional user interface objects that present relevant network information and statistics. The selected sub-context object can be displayed as an object that is adjacent to the initial context object. After step 1110, the procedure can continue to 1106 and determines if there are further sub-context objects available for selection, based on the currently selected (sub-) context.

Alternatively, referring back to step 1108, if the user does not select new a sub-procedure 1100 continues to step 1012 to determine if a new initial context object (e.g., initial context node) is selected. For example, the user may change the initial context object of 'customers' to 'California.' In doing so, the directed sub-graph dynamically derives available sub-context objects associated with the initial context object California. In turn, the dashboard interface may display such available sub-context objects for selection.

Procedure 1100 continues to step 1114 to clear the information associated with the prior context/sub-context object and present the new information associated with the current context/sub-context object in step 1116.

Procedure 1100 may further proceed to step 1106 where cloud controller 200 re-builds an available sub-context based on the new initial context object selected at step 1112. Continuing with the example above, if the user selects 'California' as the new initial context object, available sub-context objects may include 'cities' (i.e. Los Angeles, San Francisco, San Diego, Long Beach), 'customers' (i.e. Burger Joint, High-End Coffee, Sports Bar) or 'incidents' (i.e. VPN Failure, Server 'x' overload).

Returning to step 1112, if the user does not select a new initial context object, the procedure 1100 continues to 1118 where cloud controller 200 returns to previous processing, which can include repeating procedure 1100.

Figure 12:
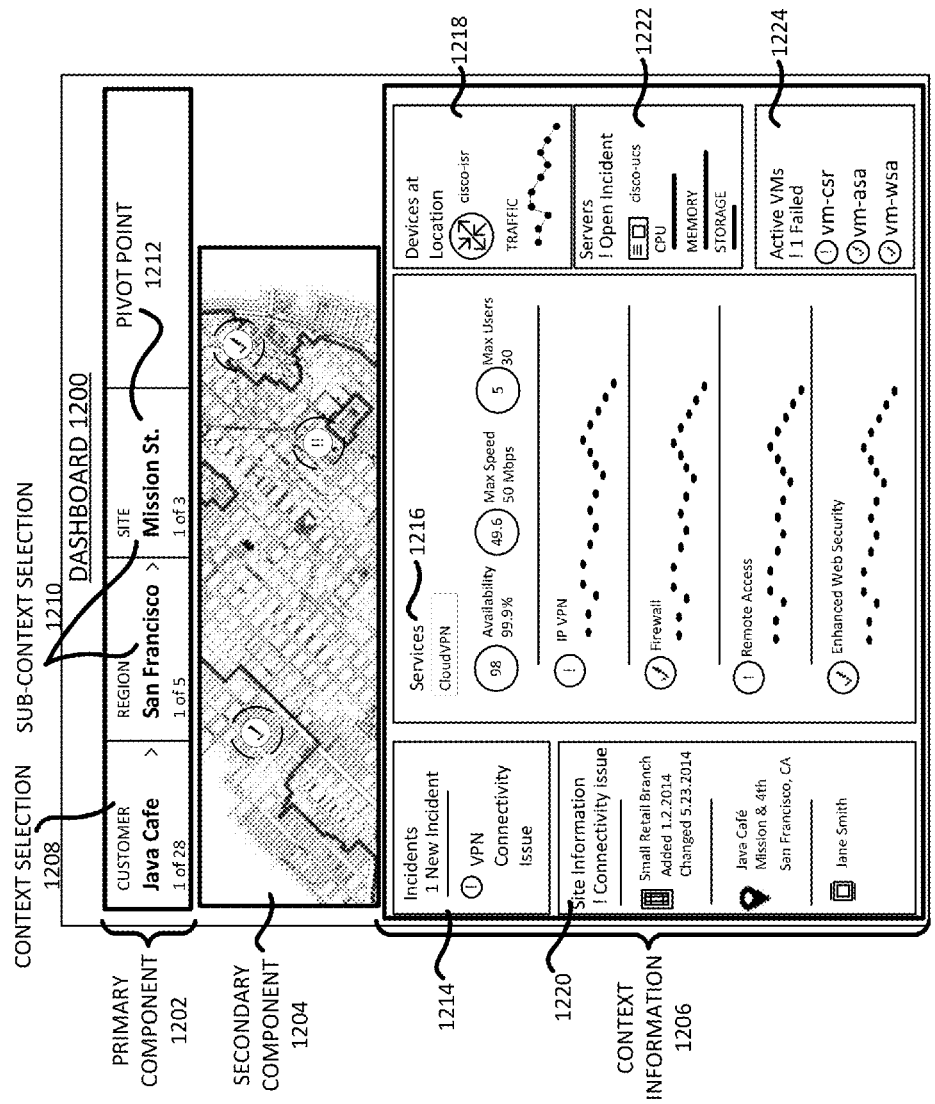
FIG. 12 illustrates an example of a dashboard interface, showing dynamic context selection of network and cloud elements.

FIG. 12 illustrates an example of a dashboard interface 1200, showing dynamic context selection of network and cloud elements. Dashboard interface 1200, like dashboard interface 700, includes a primary component 1202, secondary component 1204, and context information 1206. The primary component 1202 can include one or more user interface objects (e.g., context objects) to define a current context or scope of view for dashboard interface 1200. As illustrated, primary component 1202 includes an initial context object 1208 selection of Customer=Java Café. In addition, primary component 1202 also includes sub-context object 1210 selection of Region=San Francisco and Site=Mission Street. As shown, a present pivot point 1212 for dashboard interface 1200 is the Java Café customer site, located on Mission Street, in San Francisco.

Dashboard interface 1200 can further include a map that is rendered as part of secondary component 1204 and corresponds to the current pivot point—here, pivot point 1212. The map particularly illustrates a selected location on Mission Street. For reference, other customer locations can also be identified on the map in order to facilitate switching contexts easily.

Dashboard interface 1200 can further include tiles (e.g., the objects) within the context information 1206 field. Each of the tiles are typically rendered according to the pivot point 1212. For example, dashboard interface 1200 includes tiles for incidents 1214, services 1216, devices at location 1218, site information 1220, servers 1222, and active virtual machines (VMs) 1224. Each of these tiles can include additional details related to pivot point 1212. For example, the tile corresponding to servers 1222 can list one or more servers that are associated with the Java Café located on Mission Street. In dashboard interface 1200, the servers 1222 object shows that server=Cisco-UCS is providing services to this location of Java Café.

Dashboard interface 1200 also allows a user to dynamically select a context of displayed network and cloud elements. For example, a user may select the context by interacting with the context/sub-context objects included in the primary component. Alternatively, a user may also select context/sub-context object by interacting with the secondary component 1204 or by interacting with the tile objects in context information 1206. For example, a user may select a new pivot point 1212 by selecting an object, which assigns the object as a new initial context object and causes a determination of its related sub-context objects. For example, the user can select the server 'Cisco-UCS' tile object to assign the 'Cisco-UCS' tile object as the context for dashboard interface 1200. Dashboard interface 1200 re-pivots its display to make the server Cisco-UCS tile object the initial context node of the underlying directed sub-graph.

Figure 13:
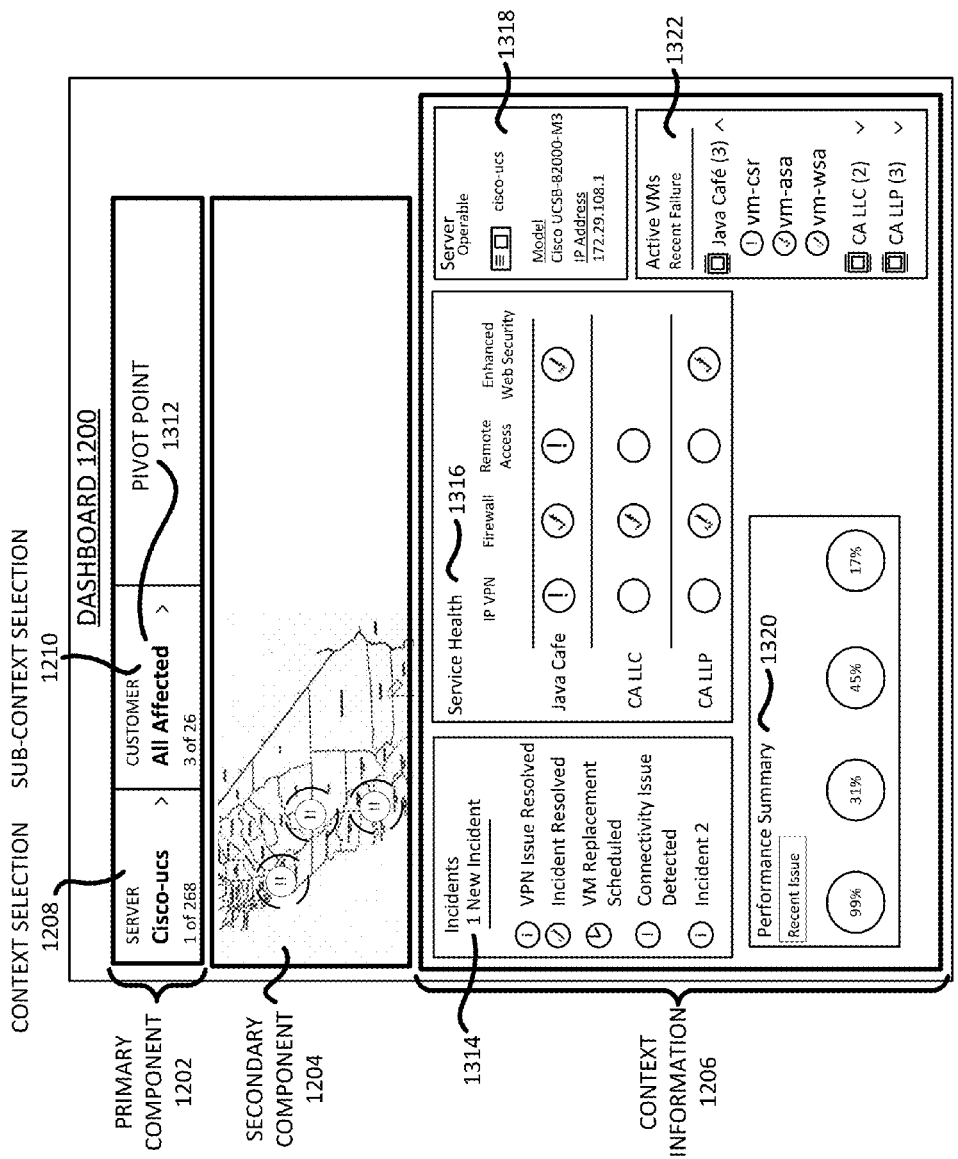
FIG. 13 illustrates the dashboard interface of in FIG. 12, further showing a display post-selection of a new pivot point.

FIG. 13 illustrates dashboard interface 1200 after selection of a new pivot point-pivot point 1312. In particular, server 'Cisco-UCS' is designated as a primary context selection 1208, with a sub-context 1210 of "All Affected" customers. Sub-context 1210 is further assigned as a pivot point 1312, which pivots dashboard 1200 (e.g., retrieving corresponding secondary component 1204 information and context information 1206) based on all of the customers affected by server 'Cisco-UCS.' As shown, secondary component 1204 displays a map of the three customers affected by the selected server. Notably, the view and display information for secondary component 1204 changed from FIG. 12 based on the new pivot point 1312.

Context information 1206 corresponding to pivot point 1312 is dynamically selected, as discussed above. Based on pivot point 1312, new context information (e.g., objects, tiles, etc.) is dynamically selected and displayed by dashboard interface 1200. As shown, the dynamically selected context information 1206 includes a tile set comprising incidents 1314, service health 1316, server 1318, a performance summary 1320, and active VMs 1322. Further, one or more of these tiles may serve as a context object (or sub-context object), as discussed above.

Figure 14:
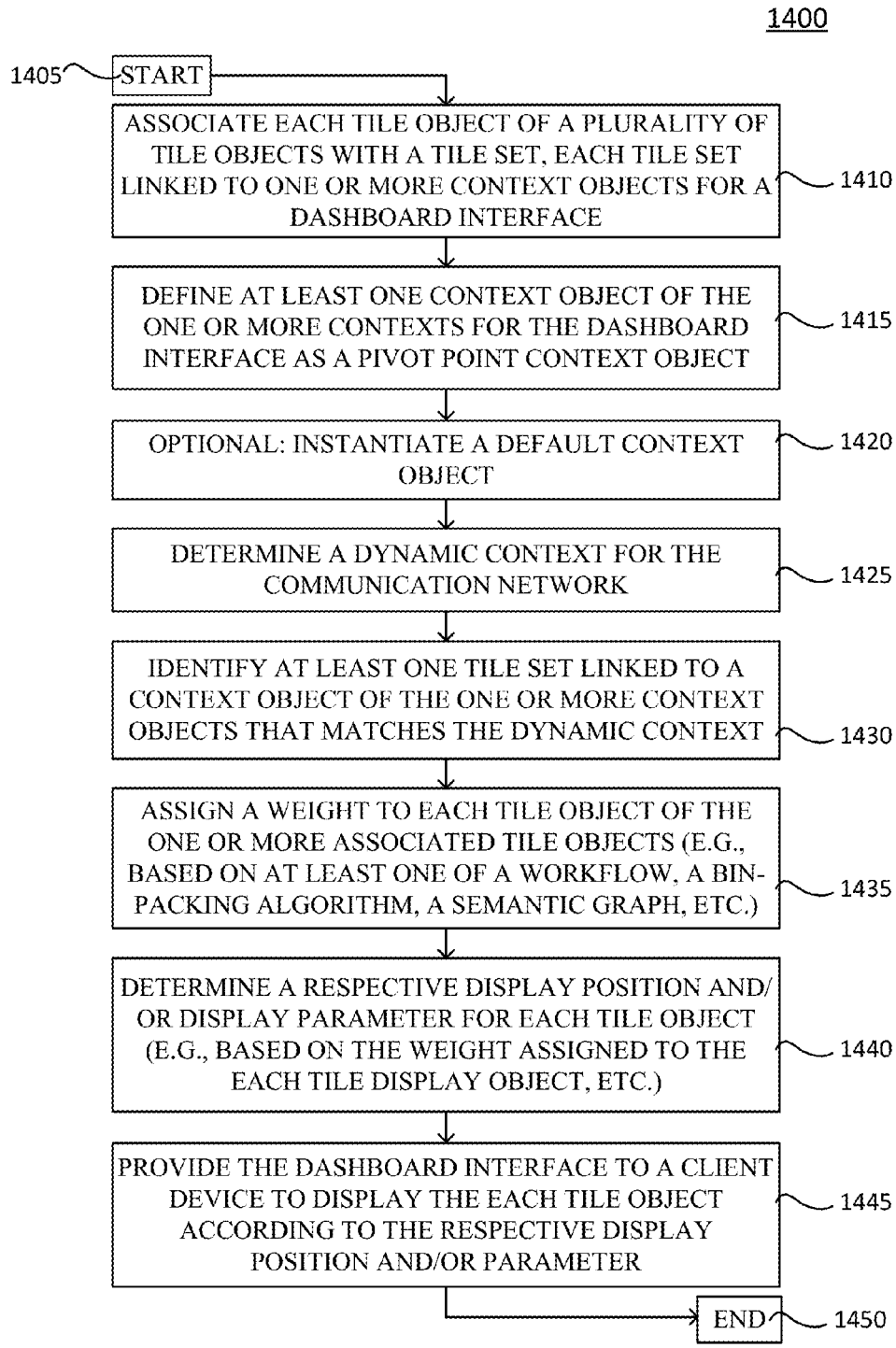
FIG. 14 illustrates an example simplified procedure for dynamic context selection of network and cloud elements and subsequent display by a dashboard interface, particularly from the perspective of a network device.

FIG. 14 illustrates an example simplified procedure 1400 for dynamic context selection of network and cloud elements and subsequent display by a dashboard interface, particularly from the perspective of a network device (e.g., cloud controller 200) in accordance with one or more embodiments described herein. Procedure 1400 begins at step 1405, and continues to step 1410, where, as described in greater detail above, tile objects are associated with a tile set, and further, each tile set may be linked to one or more contexts or context objects for a dashboard interface. Procedure 1400 continues to step 1415 where one of the context objects for the dashboard interface is defined as a pivot point object.

In some embodiments, a default context object is instantiated for the dashboard interface, shown in step 1420. For example, the default context object can be instantiated based on a network condition, a network event, a prior user interaction (e.g., user selection, a prior dashboard interface session, etc.), and the like.

Next, a dynamic context for the communication network is determined in step 1425 based on, for example, network condition, a network event, a prior user interaction, user selection, and so on. Further, the dynamic context can be matched to one context object (e.g., a pivot point context object).

Once the dynamic context is determined, a tile set linked to the context object matching the dynamic context is identified in step 1430. In some embodiments, shown in step 1435, each tile object corresponding to the tile set for the matched context object is assigned a weight. For example, weight can be determined based on a workflow, a bin-packing algorithm, a semantic graph, and the like.

Respective display positions and/or display parameters (e.g., defined by the dashboard interface) may be further determined for each of the tile objects in step 1440. For example, the respective display position and/or display parameter can be determined based on the assigned weight for the respective tile object. In step 1445, the dashboard interface is provided to a client device to display each tile object according to the respective display position and/or parameter.

Procedure 1400 may subsequently end in step 1450, or it may return again to step 1425 to determine a dynamic context for the communication network (e.g., based on a sub-context, a new pivot point, etc.).

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, the techniques disclosed herein provide a real-time process that dynamically optimizes a current state of a user interface (e.g., a visualization such as a dashboard interface) based on best practice operational models and business process frameworks. As discussed above, these techniques particularly organize the dashboard interface by a display context which sets a pivot point for the display interface. The pivot point further retrieves a particular display context (e.g., context object) for the dashboard interface. In turn, the dashboard interface further dynamically retrieves a tile set associated with the particular display context, including underlying tiles (which show network parameters). The dashboard interface further defines display characteristics or parameters such as display position, size, data aggregation level, visualization type, etc., based on various workflows (e.g., TAC troubleshooting scripts, cloud services design or deployment blueprints, audit policies, etc.). Further, these techniques provide a rule-based subsystem that interprets a context, selects and instantiates a guiding workflow, generates an optimized decision tree, and configures the active or displayed tile set accordingly. In this fashion, the techniques described herein, provide dynamic clustering or grouping of tiles, weighting or prioritizing tiles, and assigning display positions to the tiles to define a dashboard based on a context (e.g., pivot point). The dashboard particular provides rendered views of underlying system objects, provides a singular and adaptive representation of various states of the system, its components, and current context of the management console. Accordingly, the techniques disclosed herein provide coherent, on-demand top-down and bottom-up views of the system, increase operational efficiency of users, reduces time and level of effort to troubleshoot the system, ties the dashboard (user interface) and application logic to industry best practices and standard OSS/BSS frameworks, models and architectures (e.g., eTOM), and further support a systematic integration with a wide range of knowledge base systems (e.g., technical support data and workflows), resulting in smarter and more efficient applications and systems.

While there have been shown and described illustrative embodiments that provide enhanced user interface systems including dashboard interfaces, it is to be understood that various other adaptations and modifications may be made within the spirit and scope of the embodiments herein. For example, the embodiments have been shown and described herein with relation to a particular dashboard interface visualization and particular display contexts. However, the embodiments in their broader sense are not as limited, and may, in fact, be used with any number display visualizations and any number of display contexts.

Further, although the foregoing description has been directed to specific embodiments, it will be apparent that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
associating, by a processor of a network device, each tile object of a plurality of tile objects with a tile set, each tile object including one or more parameters of a communication network, each tile set linked to one or more context objects for a dashboard interface;
determining, by the processor, a dynamic context for the communication network by assigning a weight to each context object of the one or more context objects and indexing the each context object in a hierarchal model;
identifying, by the processor, at least one tile set linked to a context object of the one or more context objects that matches the dynamic context, the at least one tile set includes one or more associated tile objects;
determining, by the processor, a respective display position defined by the dashboard interface to each tile object of the one or more associated tile objects; and
providing, by the processor, the dashboard interface to a client device to cause the client device to display the each tile object of the one or more associated tile objects according to the respective display position.

2. The method of claim 1, further comprising:
defining, by the processor, at least one context object of the one or more contexts for the dashboard interface as a pivot point context object,
wherein determining the dynamic context for the communication network further comprises matching the dynamic context to the at least one context object defined as the pivot point context object.

3. The method of claim 1, wherein determining the dynamic context for the communication network further comprises:
receiving, by the processor, a user-selected context for the dashboard interface; and
assigning, by the processor, the user-selected context for the dashboard interface as the dynamic context for the communication network.

4. The method of claim 1, wherein determining the dynamic context for the communication network further comprises:
determining, by the processor, a current network event or current network condition for the communication network.

5. The method of claim 1,
wherein the hierarchal model associates the each context object with at least one of an initial context object or a sub-context object relative to the initial context object, and
wherein determining the dynamic context for the communication network further comprises:
assigning, by the processor, the context object that matches the dynamic context as the initial context object; and
wherein, providing the dashboard interface to the client device further comprises:
providing the dashboard interface to the client device to cause the client device to display the initial context object and at least one option to pivot the dashboard interface according to at least one sub-context object relative to the initial context object.

6. The method of claim 1, further comprising:
instantiating, by the processor, a default context object as the dynamic context for the communication network based on prior user interaction with the dashboard interface.

7. The method of claim 1, wherein determining the respective display position further comprises determining a respective display parameter to the each tile object of the one or more associated tile objects.

8. The method of claim 7, further comprising:
assigning a weight to each tile object of the one or more associated tile objects based on at least one of a workflow, a bin-packing algorithm, or a semantic graph,
wherein, determining the respective display position further comprises determining the respective display position and the respective display parameter to the each tile object of the one or more associated tile objects based on the weight assigned to the each tile display object.

9. The method of claim 1, wherein the one or more context objects represent at least one of a customer, a location, a region, a communication network system, a bandwidth for the communication network, a router, server, a virtual machine, a network event, or a network condition.

10. A network device comprising:
one or more network interfaces to communicate in a communication network;
a processor coupled to the network interfaces and adapted to execute one or more processes; and
a memory configured to store a process, the process, when executed by the processor, is operable to:
associate each tile object of a plurality of tile objects with a tile set, each tile object including one or more parameters of the communication network, each tile set linked to one or more context objects for a dashboard interface;
determine a dynamic context for the communication network by assigning a weight to each context object of the one or more context objects and indexing the each context object in a hierarchal model,
identify at least one tile set linked to a context object of the one or more context objects that matches the dynamic context, the at least one tile set includes one or more associated tile objects,
determine a respective display position defined by the dashboard interface for each tile object of the one or more associated tile objects, and
provide the dashboard interface to a client device to cause the client device to display the each tile object of the one or more associated tile objects according to the respective display position.

11. The network device of claim 10,
wherein the process, when executed by the processor, is further operable to:
define at least one context object of the one or more contexts for the dashboard interface as a pivot point context object; and
wherein the process to determine the dynamic context for the communication network is further operable to:
match the dynamic context to the at least one context object defined as the pivot point context object.

12. The network device of claim 10, wherein the process to determine the dynamic context for the communication network is further operable to:
receive a user-selected context for the dashboard interface; and
assign the user-selected context for the dashboard interface as the dynamic context for the communication network.

13. The network device of claim 10, wherein the process to determine the dynamic context for the communication network is further operable to:
determine a current network event or current network condition for the communication network.

14. The network device of claim 10,
wherein the process to determine the dynamic context for the communication network is further operable to:
assign a weight to each context object of the one or more context objects for the dashboard interface,
index the each context object of the one or more context objects in a hierarchal model, the hierarchal model associates the each context object with at least one of an initial context object or a sub-context object relative to the initial context object, and
assign the context object that matches the dynamic context as the initial context object; and wherein, the process to provide the dashboard interface to the client device is further operable to:
provide the dashboard interface to the client device to cause the client device to display the initial context object and at least one option to pivot the dashboard interface according to at least one sub-context object relative to the initial context object.

15. The network device of claim 10, wherein the process, when executed by the processor, is further operable to:
instantiate a default context object as the dynamic context for the communication network based on prior user interaction with the dashboard interface.

16. The network device of claim 10, wherein the process to determine the respective display position is further operable to assign a respective display parameter to the each tile object of the one or more associated tile objects.

17. The network device of claim 16,
wherein the process, when executed by the processor, is further operable to:
assign a weight to each tile object of the one or more associated tile objects based on at least one of a workflow, a bin-packing algorithm, or a semantic graph; and
wherein, the process to determine the respective display position is further operable to:
determine the respective display position and the respective display parameter to the each tile object of the one or more associated tile objects based on the weight assigned to the each tile display object.

18. A tangible, non-transitory, computer-readable media having instructions encoded thereon, the instructions, when executed by a processor, operable to:
associate each tile object of a plurality of tile objects with a tile set, each tile object including one or more parameters of a communication network, each tile set linked to one or more context objects for a dashboard interface;
determine a dynamic context for the communication network by assigning a weight to each context object of the one or more context objects and indexing the each context object in a hierarchal model;
identify at least one tile set linked to a context object of the one or more context objects that matches the dynamic context, the at least one tile set includes one or more associated tile objects;
determine a respective display position defined by the dashboard interface for each tile object of the one or more associated tile objects; and
provide the dashboard interface to a client device to cause the client device to display the each tile object of the one or more associated tile objects according to the respective display position.

19. The tangible, non-transitory, computer-readable media of claim 18, wherein the instructions, when executed by the processor, are further operable to:
define at least one context object of the one or more contexts for the dashboard interface as a pivot point context object,
wherein the process to determine the dynamic context for the communication network is further operable to match the dynamic context to the at least one context object defined as the pivot point context object.

20. The tangible, non-transitory, computer-readable media of claim 18, wherein the instructions, when executed by the processor, are further operable to:
receive a user-selected context for the dashboard interface; and assign the user-selected context for the dashboard interface as the dynamic context for the communication network.

\* \* \* \* \*